US012494945B2

(12) United States Patent
Dharwadkar et al.

(10) Patent No.: US 12,494,945 B2
(45) Date of Patent: Dec. 9, 2025

(54) SYSTEMS AND METHODS FOR VIRTUALIZED WIRELESS BASE STATION NETWORKING SOLUTIONS

(71) Applicant: Outdoor Wireless Networks LLC, Richardson, TX (US)

(72) Inventors: Sriram Dharwadkar, Bangalore (IN); Devaraj Sambandan, Bengaluru (IN); Shanthakumar Ramakrishnan, Westford, MA (US); Irfaan Ahamed Salahuddeen, Acton, MA (US); James J Ni, Medford, MA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 408 days.

(21) Appl. No.: 18/056,602

(22) Filed: Nov. 17, 2022

(65) Prior Publication Data

US 2023/0155862 A1 May 18, 2023

(30) Foreign Application Priority Data

Nov. 17, 2021 (IN) ............................ 202141052808

(51) Int. Cl.
*H04L 12/46* (2006.01)

(52) U.S. Cl.
CPC ................................ *H04L 12/4641* (2013.01)

(58) Field of Classification Search
CPC .................................................. H04L 12/4641
See application file for complete search history.

(56) References Cited

U.S. PATENT DOCUMENTS 11,159,366 B1 10/2021 Gawade et al.
2014/0201733 A1 7/2014 Benny et al.
(Continued)

FOREIGN PATENT DOCUMENTS

WO 2018200648 A1 11/2018

OTHER PUBLICATIONS

"5G-Kubernetes Service Port Autogeneration for gNB Pods" as downloaded May 22, 23 from https://csjira.atlassian.net/wiki/spaces/5G/pages/495553107/Kubernetes+CNI+Plugin++-+DANM.
(Continued)

*Primary Examiner* — Blake J Rubin
(74) *Attorney, Agent, or Firm* — Fogg & Powers LLC

(57) ABSTRACT

Systems and methods for virtualized wireless base station networking solutions are provided. In one embodiment, a controller for a telecommunications wireless base station comprises: one or more physical network interfaces; at least one processor programed to execute code on the controller: one or more virtualized entities for one or more virtual network functions of the base station, wherein a first virtual network function comprises a plurality of functional applications that each includes a respective network interface for connecting to a data network; a virtual network interface dedicated stack associated with each network interface, wherein a respective virtual network interface dedicated stack defines for each network interface a virtual media access control (VMAC) address, a virtual network interface (VF), a virtual local area network (VLAN), and a logical subnetwork internet protocol (IP) address. Each functional applications is bound to the physical network interfaces by their respective virtual network interface dedicated stack.

24 Claims, 15 Drawing Sheets

(56) References Cited

U.S. PATENT DOCUMENTS

| | | | | |
|---|---|---|---|---|
| 2015/0181514 | A1* | 6/2015 | Belghoul | H04W 76/27 370/254 |
| 2016/0021684 | A1* | 1/2016 | Lewis | H04W 4/80 370/329 |
| 2017/0005915 | A1* | 1/2017 | Mirsky | H04L 45/28 |
| 2018/0175924 | A1* | 6/2018 | Ercan | H04W 76/16 |
| 2018/0254919 | A1* | 9/2018 | Van De Velde | H04L 45/66 |
| 2019/0273683 | A1* | 9/2019 | Jiang | G06F 9/45558 |
| 2019/0342187 | A1 | 11/2019 | Zavesky et al. | |
| 2019/0372929 | A1 | 12/2019 | Yang et al. | |
| 2020/0329381 | A1 | 10/2020 | Chou et al. | |
| 2020/0412608 | A1* | 12/2020 | Dunbar | H04L 67/141 |
| 2021/0036889 | A1* | 2/2021 | Jain | H04L 61/2535 |
| 2021/0067408 | A1 | 3/2021 | Vaidya et al. | |
| 2021/0132981 | A1 | 5/2021 | Thakkar et al. | |
| 2021/0274426 | A1 | 9/2021 | Grayson et al. | |
| 2021/0377920 | A1* | 12/2021 | Yan | H04L 1/1671 |

OTHER PUBLICATIONS

"ON-974" as downloaded May 22, 23 from https://odart.arrisi.com/si/jira.issueviews:issue-html/ON-974/ON-974.html.

Dharwadkar, "Kubernetes CNI Pubin—DANM" as downloaded on May 22, 23 from https://csjira.atlassian.net/wiki/spaces/5G/pages/628818029/Kubernetes+Service+Port+Autogeneration+for+gNB+Pods.

International Searching Authority, "International Search Report and Written Opinion", from PCT Application No. PCT/US2022/080071, from Foreign Counterpart to U.S. Appl. No. 18/05/,602, Apr. 20, 2023, pp. 1 through 9, Published: WO.

European Patent Office, "Extended European Search Report", dated Sep. 15, 2025, from U.S. Appl. No. 18/056,602, from Foreign Counterpart to U.S. Appl. No. 18/056,602, pp. 1 through 12, Published: EP.

* cited by examiner

SYSTEMS AND METHODS FOR VIRTUALIZED WIRELESS BASE STATION NETWORKING SOLUTIONS

CROSS-REFERENCE TO RELATED APPLICATIONS

This application claims the benefit of Indian Provisional Patent Application No. 202141052808, filed on Nov. 17, 2021, which is hereby incorporated herein by reference in its entirety.

BACKGROUND

Cloud-based virtualization of Fifth Generation (5G) base stations (also referred to as "g NodeBs" or "gNBs") is widely promoted by standards organizations, wireless network operators, and wireless equipment vendors. Such an approach can help provide better high-availability and scalability solutions as well as address other issues in the network.

In general, a distributed 5G gNodeB can be partitioned into different entities, each of which can be implemented in different ways. For example, each entity can be implemented as a physical network function (PNF) or a virtual network function (VNF) and in different locations within an operator's network (for example, in the operator's "edge cloud" or "central cloud"). A distributed 5G gNodeB, while mapped to a central unit (CU), can be partitioned into one or more distributed units (DUs), and one or more radio units (RUs), while there may be one or more gNodeBs within a given venue. Each CU can be further partitioned into a central unit control-plane (CU-CP) and one or more central unit user-planes (CU-UPs) dealing with the gNodeB Packet Data Convergence Protocol (PDCP) and above layers of functions of the respective planes, and each DU configured to implement the upper part of the physical layer through radio link control layers of both the control-plane and user-planes of the gNodeB. In this example, each RU is configured to implement the radio frequency (RF) interface and lower physical layer control-plane and user-plane functions of the gNodeB. Each RU is typically implemented as a physical network function (PNF) and is deployed in a physical location where radio coverage is to be provided. Each DU is typically implemented as a virtual network function (VNF) and, as the name implies, is typically distributed and deployed in a distributed manner in the operator's edge cloud. Each CU-CP and CU-UP are typically implemented as virtual network functions (VFs) and, as the name implies, are typically centralized and deployed in the operator's central cloud.

In a traditional PNF implementation of networking devices, all network interface functional applications, even though implemented in a multi-layer and multi-process/thread manner, are bound to the assigned physical network interface as a whole, which implies that the network interface functional applications have to be together and with the assigned physical network interface(s). That is, the CU-CP, CU-UP, and DU networking applications are each bound to the respective physical network interface, and, thus, the applications have to be together and with the assigned physical network interface.

In a VNF implementation with single root I/O virtualization (SR-IOV) capability on the physical network interface(s), the physical network interface(s) can be partitioned into multiple network interface virtual functions (VFs) together with one controlling physical function (PF), and each of them is equivalent to a real physical network interface in terms of functions. Additionally, different network interface functional applications can be implemented and packed into independent VNFs where each VNF is bound to different VFs. In such an implementation, the overall network device function is divided into smaller functions and network interface dedicated smaller pieces, allowing the deployment of the entire network device function in a distributed virtualized manner as possible. However, the cloud infrastructures that host virtual base station implementations typically host multiple base station deployments. This can lead to challenges with respect to management and troubleshooting for cloud-deployed base stations with respect to identifying associations between VFs and their associated base stations.

SUMMARY

The embodiments of the present disclosure provide methods and systems for virtualized wireless base station networking solutions and will be understood by reading and studying the following specification.

Systems and methods for virtualized wireless base station networking solutions are provided. In one embodiment, a controller for a telecommunications wireless base station comprises: one or more physical network interfaces; at least one processor programmed to execute code on the controller: one or more virtualized entities for one or more virtual network functions of a telecommunications base station, wherein at least a first virtual network function comprises a plurality of functional applications that each includes a respective network interface for connecting to a data network; a virtual network interface dedicated stack associated with each of the respective network interfaces, wherein a respective virtual network interface dedicated stack defines for each of the plurality of network interfaces a virtual media access control (VMAC) address, a virtual network interface (VF), a virtual local area network (VLAN), and a logical subnetwork internet protocol (IP) address; wherein each of the plurality of functional applications are bound to the one or more physical network interfaces by their respective virtual network interface dedicated stack.

DRAWINGS

Embodiments of the present disclosure can be more easily understood and further advantages and uses thereof more readily apparent, when considered in view of the description of the preferred embodiments and the following figures in which:

FIGS. 1, 2, 2A, and 3 are block diagrams illustrating one example of a virtualized base station embodiment.

FIGS. 4 and 4A are diagrams illustrating a gNB example embodiment that includes a first controller and a second controller configured as cloud worker nodes to implement a CU-CP, CU-UP, and DU as virtualized entities.

FIGS. 5A, 5B, and 5C are diagrams illustrating an example implementation of virtual network interface dedicated stacks incorporated into a virtualized base station.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which are shown by way of specific illustrative embodiments in which the embodiments may be practiced. These embodiments are described in sufficient detail to enable those skilled in the art to practice the embodiments, and it is to be understood that other embodiments may be utilized and that logical, mechanical, and electrical changes may be made without departing from the scope of the present disclosure. The following detailed description is, therefore, not to be taken in a limiting sense.

Figure 1:
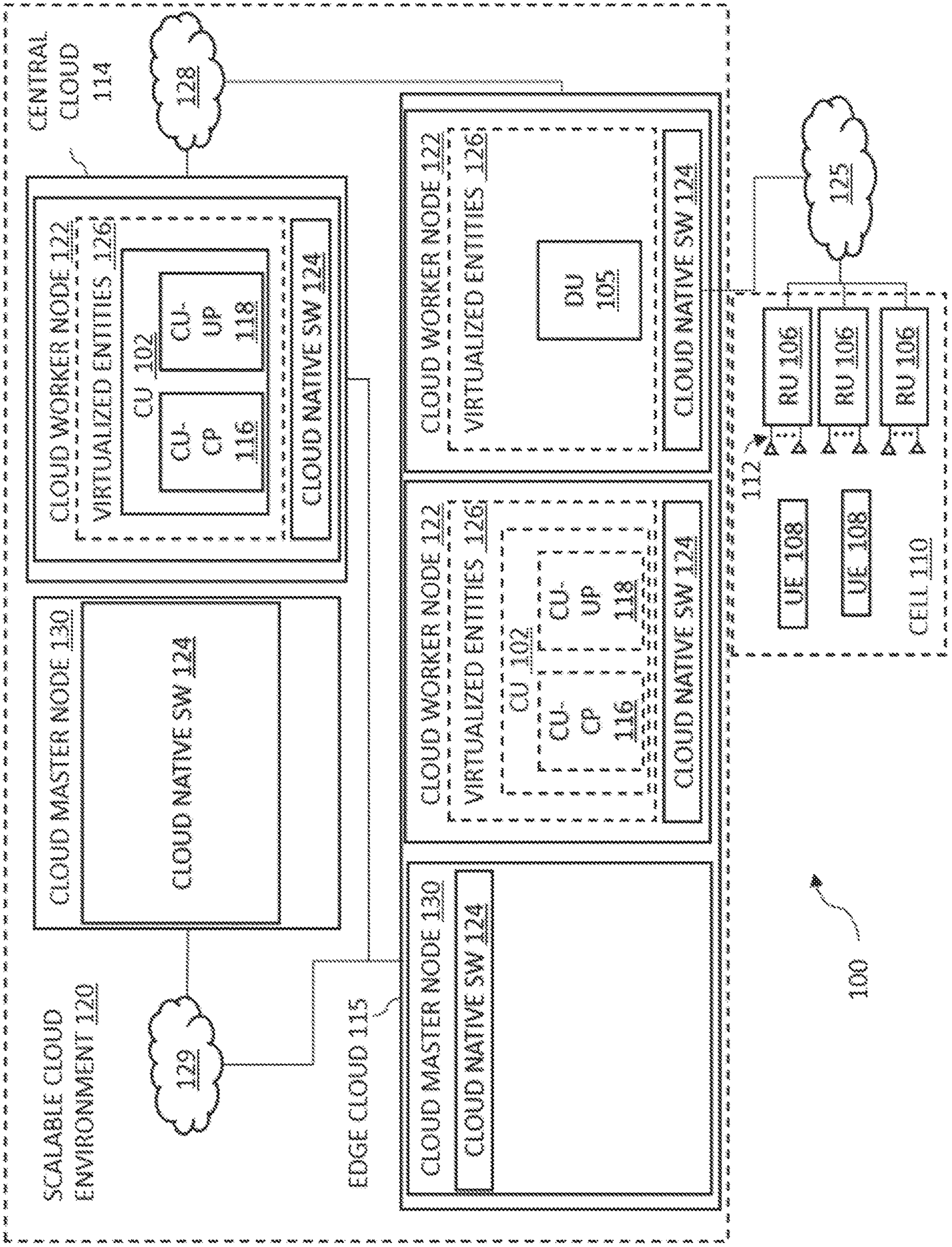

FIG. 1 is a block diagram illustrating one example of a virtualized wireless base station 100 on a VNF hosting platform on which the virtualized VLAN/IP interface generation solutions for gNodeB VNFs described herein are provided. The VNF hosting platform comprises a processor (i.e., a central processing unit (CPU)) and a memory, which, together, store and execute code to realize aspects of the virtualized wireless base station 100 in operation. In the context of a fourth generation (4G) Long Term Evolution (LTE) system, a base station 100 may also be referred to as an "evolved NodeB" or "eNodeB," and in the context of a fifth generation (5G) New Radio (NR) system, may also be referred to as a "gNodeB." Base station 100 may be referred to as something else in the context of other wireless interfaces.

In the particular example shown in FIG. 1, the virtualized wireless base station 100 comprises a 5G gNodeB 100 associated with a central units 102 (where one or more gNodeBs can be deplayed within given venue/site), which includes a central unit control-plane (CU-CP) 116 and one or more central unit user-plane (CU-UP) 118. The gNodeB 100 is further partitioned into one or more distributed units (DU) and one or more radio units (RUS) 106. In this example, the virtualized 5G gNodeB 100 is configured so that each CU 102 is configured to serve one or more DUs 105, and each DU 105 is configured to serve one or more RUs 106. In the particular configuration shown in FIG. 1, a single CU 102 serves a single DU 105, and the DU 105 shown in FIG. 1 serves three RUs 106. However, the particular configuration shown in FIG. 1 is only one example. In other embodiments, other numbers of CUs 102, DUs 105, and RUs 106 can be used. Also, the number of DUs 105 served by each CU 102 can vary between different CUs 102. Likewise, the number of RUs 106 served by each DU can vary between different DUs 105. Each of the CU, CU-UP, CU-CP, and DU may be implemented as virtual network functions, as discussed below.

Moreover, although the following embodiments are primarily described as being implemented for use to provide 5G NR service, it is to be understood that the techniques described here can be used with other wireless interfaces (for example, fourth generation (4G) Long-Term Evolution (LTE) service) and references to "gNodeB" used in this disclosure can be replaced with the more general term "base station" or "base station entity" and/or a term particular to the alternative wireless interfaces (for example, "enhanced NodeB" or "eNB"). Furthermore, it is also to be understood that 5G NR embodiments can be used in both standalone and non-standalone modes (or other modes developed in the future), and the following description is not intended to be limited to any particular mode. Also, unless explicitly indicated to the contrary, references to "layers" or a "layer" (for example, Layer 1, Layer 2, Layer 3, the Physical Layer, the MAC Layer, etc.) set forth herein, refer to layers of the wireless interface (for example, 5G NR or 4G LTE) used for wireless communication between a base station and user equipment.

In general, a virtualized gNodeB 100 may be configured to provide wireless service to various numbers of user equipment (UEs) 108 using one or more cells 110. For example, as shown in FIG. 1, a virtualized gNodeB 100 may support two or more cells as the virtualized gNodeB 100 includes two CUs 102. Each RU 106 includes or is coupled to a respective set of one or more antennas 112 via which downlink RF signals are radiated to UEs 108 and via which uplink RF signals transmitted by UEs 108 are received.

In one configuration (used, for example, in indoor deployments), each RU 106 is co-located with its respective set of antennas 112 and is remotely located from the DU 105 and CU 102 serving it as well as the other RUs 106. In another configuration (used, for example, in outdoor deployments), the respective sets of antennas 112 for multiple RUs 106 are deployed together in a sectorized configuration (for example, mounted at the top of a tower or mast), with each set of antennas 112 serving a different sector. In such a sectorized configuration, the RUs 106 need not be co-located with the respective sets of antennas 112 and, for example, can be co-located together (for example, at the base of the tower or mast structure) and, possibly, co-located with its serving DU 105. Other configurations can be used.

The virtualized gNodeB 100 is implemented using a scalable cloud environment 120 in which resources used to instantiate each type of entity can be scaled horizontally (that is, by increasing or decreasing the number of physical computers or other physical devices) and vertically (that is, by increasing or decreasing the "power" (for example, by increasing the amount of processing and/or memory resources) of a given physical computer or other physical device). The scalable cloud environment 120 can be implemented in various ways.

For example, the scalable cloud environment 120 can be implemented using hardware virtualization, operating system virtualization, and application virtualization (also referred to as containerization) as well as various combinations of two or more of the preceding. The scalable cloud environment 120 can be implemented in other ways. For example, as shown in FIG. 1, the scalable cloud environment 120 is implemented in a distributed manner. That is, the scalable cloud environment 120 is implemented as a distributed scalable cloud environment 120 comprising at least one central cloud 114 and at least one edge cloud 115.

In the example shown in FIG. 1, each RU 106 is implemented as a physical network function (PNF) and is deployed in or near a physical location where radio coverage is to be provided. In this example, each DU 105 is implemented with one or more DU VNFs and may be distributed and deployed in a distributed manner in the edge cloud 115.

Each CU-CP and CU-UP is also implemented as a virtual network function (VNF). In FIG. 1, the CU-CP 116 and CU-UP 118 are centralized and deployed in the central cloud 114. In other embodiments, one or both may be deployed in the edge cloud 115. In the example shown in FIG. 1, the CU 102 (including the CU-CP 116 and CU-UP 118) and the entities used to implement it are communicatively coupled to each DU 105 served by the CU 102. In some embodiments, one or more of the virtual entities 126 of the central cloud 114 and one or more of the virtual entities 126 of the edge cloud 115 are communicatively coupled over a midhaul network 128 (for example, a network that supports the Internet Protocol (IP)). In the example shown in FIG. 1, each DU 105 is communicatively coupled to the RU 106 served by the DU 105 using a fronthaul network 125 (for example, a switched Ethernet network that supports the IP). In some embodiments, an orchestration and management network 129 is used to couple cloud worker nodes 122 hosting virtualized entities 126 in the edge cloud 115 to a cloud master node 130 that defines an orchestration central cloud (discussed below) that hosts orchestration functions for establishing VNF on the cloud worker nodes 122 of the central cloud 114 and/or edge cloud 115.

The scalable cloud environment 120 comprises one or more cloud worker nodes 122 that are configured to execute cloud native software 124 that, in turn, is configured to instantiate, delete, communicate with, and manage one or more virtualized entities 126 (e.g. the CU-CP 116, CU-UP 118 and DU 105). Each of the cloud worker nodes 122 may comprise one or more virtualized entities 126 and a cloud native software 124, the cloud native software 124 may comprise a shared host operating system, and the virtualized entities 126 comprise one or more virtual network functions (VNFs), and each VNF further comprises one or more functional containers. In another example, the cloud worker nodes 122 comprise respective clusters of physical worker nodes, the cloud native software 124 comprises a hypervisor (or similar software), and the virtualized entities 126 comprise virtual machines.

In the example shown in FIG. 1, the scalable cloud environment 120 includes at least one cloud "master" node 130. There are certain responsibilities that the cloud "master" node 130 has as far as instantiation and clustering of cloud worker nodes 122. The cloud master node 130 is configured to implement management and control plane processes for the worker nodes 122 in a cluster. In some examples, the cloud master node 130 is configured to determine what runs on each of the cloud worker nodes 122, which can include scheduling, resource allocation, state maintenance, and monitoring. In some examples, the cloud master node is configured to manage the lifecycle, scaling, and upgrades of workloads (such as containerized applications) on the cloud worker nodes 122. In some embodiments, a cloud master node 130 may be coupled to the edge cloud 115 and orchestration and management network 129 (which may be distinct from the backhaul network 128) to provide orchestration functions to install and implement any of the virtualized entities 126 discussed herein. In some embodiments, orchestration central cloud functions for edge cloud orchestration can be accessed by the cloud worker nodes 122 (of either the central or edge clouds) through an IPsec tunnel established via the orchestration and management network 129.

Each of the virtual network functions, DU 105, CU-CP 116, and CU-UP 118 is implemented as at least one software virtualized entity 126 that is executed in the scalable cloud environment 120 on a cloud worker node 122 under the control of the cloud native software 124 executing on that cloud worker node 122. In the following description, a cloud worker node 122 that implements at least a part of a CU 102 (for example, a CU-CP 116 and/or a CU-UP 118) is also referred to here as a "CU cloud worker node" 122, and a cloud worker node 122 that implements at least a part of a DU 105 is also referred to here as a "DU cloud worker node" 122.

In the example embodiment of gNodeB 100, the CU-CP 116 and the CU-UP 118 are each implemented as a respective virtualized entity 126 executing on the same cloud worker node 122. The DU 105 may be implemented as a virtualized entity 126 executing on the same cloud worker node 122 or a different cloud worker node 122. In other configurations and examples, the CU 102 can be implemented using multiple CU-UP VNFs 118 using multiple virtualized entities 126 executing on one or more cloud worker nodes 122. In another example, multiple DUs 105 (using multiple virtualized entities 126 executing on one or more cloud worker nodes 122) can be used to serve a cell, where each of the multiple DUs 105 serves a different set of RUs 106. Moreover, it is to be understood that the CU 102 and DU 105 can be implemented in the same cloud (for example, together in an edge cloud 215). Other configurations and examples can be implemented in other ways. For example, in some embodiments, the CU-UP VNF 118 can be functionally divided into parts or sub-sets, with those sub-sets distributed between two (or more) virtualized entities 126, which may be implemented on different nodes 122. In some embodiments, Kubernetes (K8s) is utilized to provide the virtual network functions (VNFs) service orchestration/management functions. The virtual network functions (VNFs) service configuration and activation functions may be provided by a small cell Device Management System (DMS) such as, but not limited to, the CommScope, Inc. Device Management System.

Both the cloud master nodes 130 and cloud worker nodes 122 may be implemented by controllers (some of which may also be referred to as compute nodes) that comprise server hardware that includes a processor and memory programmed to execute and implement the various functions, processes, and VNF described herein. A first controller in the edge cloud 115 functions as a Kubernetes master and gNodeB CU node hosting the CU-CP 116 and CU-UP 118 in this example. A second controller in the edge cloud 115 functions as Kubernetes workers and the gNodeB DU node (s) hosting the DU 105. In some embodiments, off-the-shelf bare metal server hardware may be used for the controllers that will ultimately host the virtualized entities 126.

Figure 2:
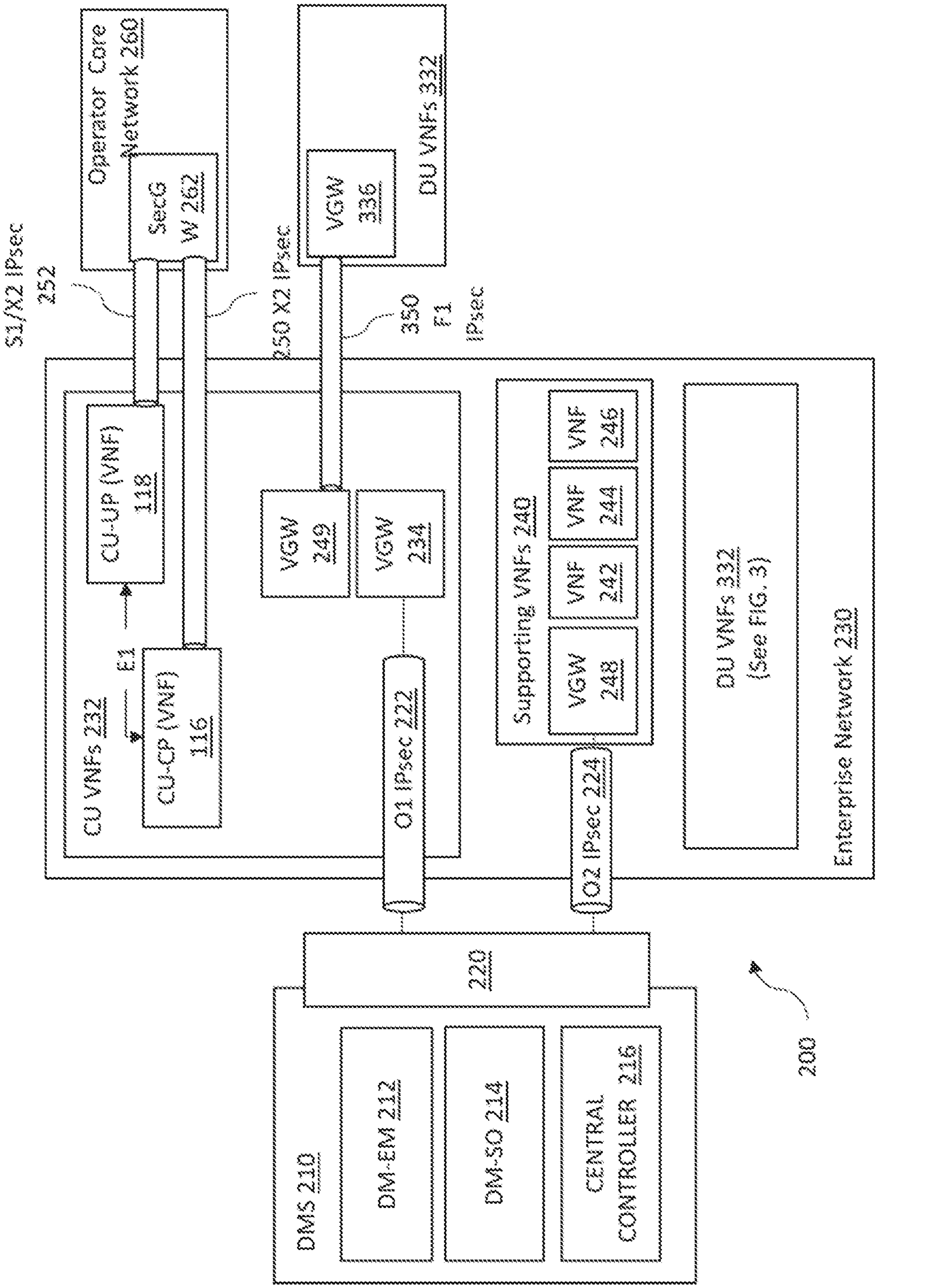
Figure 2A:
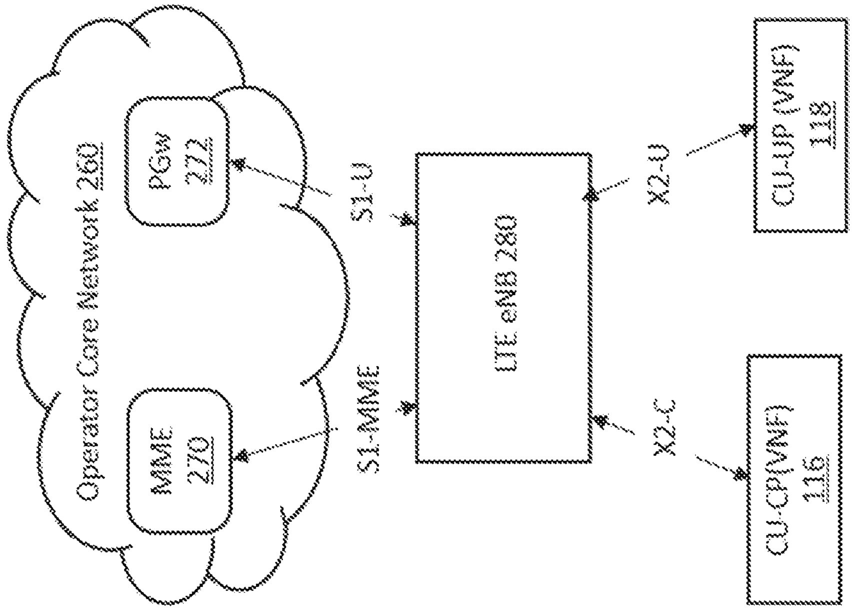
Figure 3:
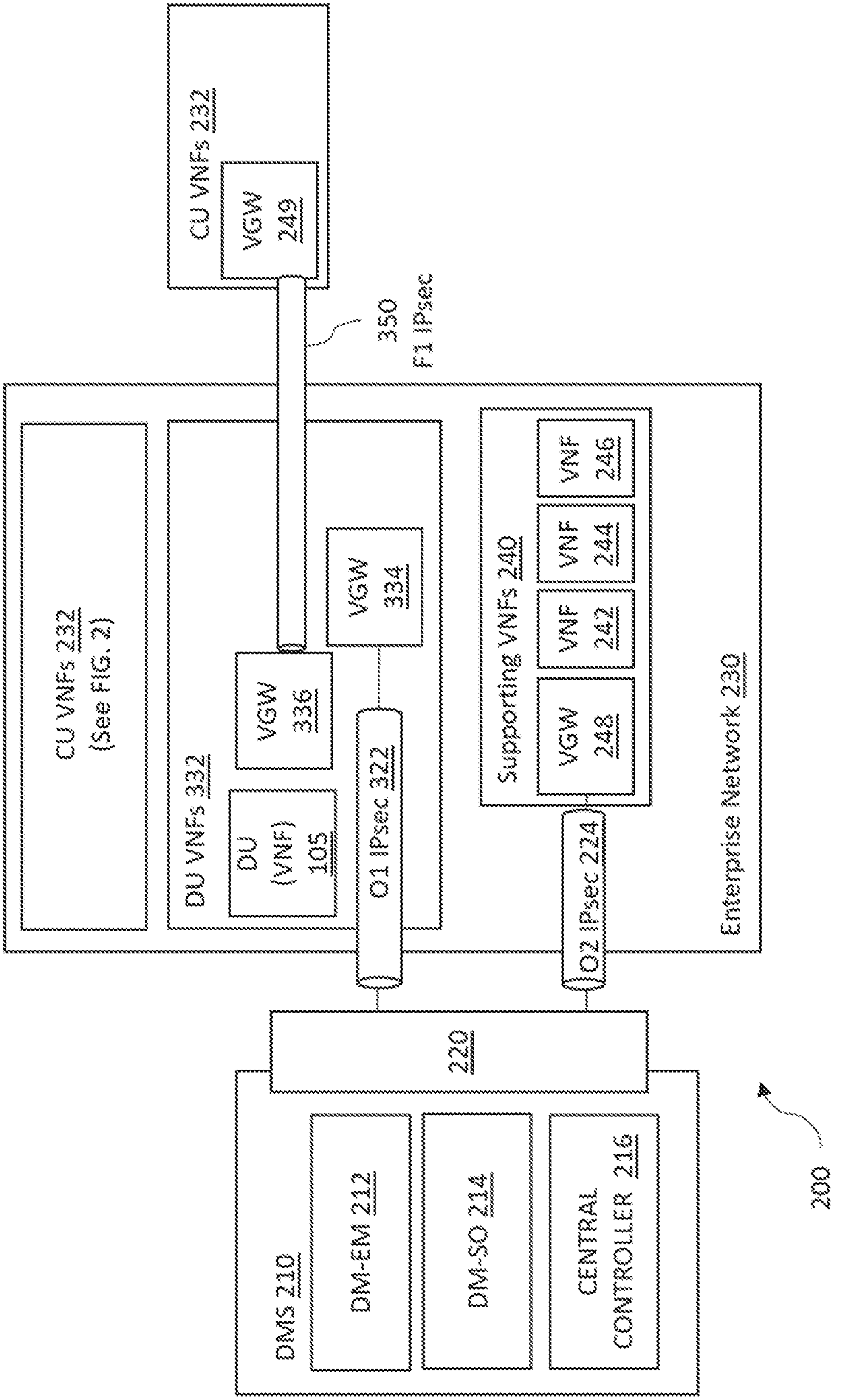

FIGS. 2, 2A, and 3 are diagrams of an example gNodeB 200. In addition to the functional elements as shown in FIG. 1, infrastructure and service orchestration, as well as other operation-supporting functions for a fully functional gNB, are connected by appropriate networking solutions, including each application interface having a virtual network interface dedicated stack (VFDS) as illustrated and discussed further below. A detailed view of the interfaces, network connections as well as all relevant internal and external counterpart entities are shown in FIGS. 2, 2A, and 3.

With respect to the CU 102, which is implemented in FIG. 2 as CU VNFs 232, an O2 interface and connection may be established to virtual infrastructure management (VIM), virtual network function management (VNFM), as well as other orchestration service functions. The CU-CP VNF 116 may include: 1) an X2-C interface and connection to an LTE eNB 280, 2) an E1 interface and connection to the CU-UP VNF 118, 3) an F1-C interface and connection 254 to the DU VNFs 260, and/or 4) an O1 interface and connection to configuration, fault management, performance monitoring (PM), and OAM functions on DMS 210. The CU-UP VNF 118 may include: 1) an X2-U interface and connection to LTE eNB 280, 2) an S1-U interface and connection to data network, 3) an E1 interface and connection to CU-CP 116, 4) an F1-U interface and connection to the DU(s) 332, and/or 5) an O1 interface and connection to configuration, fault management, performance monitoring (PM), and OAM functions on DMS 210.

Regarding the DU 105, which is implemented in FIG. 3 as DU VNFs 332, an O2 interface and connection may be established to virtual infrastructure management (VIM), virtual network function management (VNFM), as well as other orchestration service functions. Additionally, a DU VNF 332 may include: 1) an F1-C interface and connection to the CU-CP 116 of CU VNF 232, 2) an F1-U interface and connection to CU-UP 118 of CU VNF 232, 3) an eCPRI interface and connections to the RUs 106 (not shown), and/or 4) an O1 interface and connection to configuration, fault management, performance monitoring (PM) and OAM functions on DMS 210.

With respect to interfaces and connectivity in non-standalone (NSA) mode as specified in the 3GPP/ETSI standards, FIG. 2A illustrates the LTE eNB 280 with an X2-C interface and connection to CU-CP VNF 116, an X2-U interface and connection to CU-UP VNF 118, an S1-MME interface and connection for the LTE eNB 280 to the Mobile Management Entity (MME) 270 of the operator core network 260 (mobile core), and an S1-U interface and connection for the LTE eNB 280 to the Packet Gateway (PGw) 272 of the operator core network 260 (data network).

As explained herein, each of these gNB internal and external interfaces and connections is appropriately networked by the embodiments disclosed herein to serve the desired gNB functions via dedicated virtual network interfaces. Moreover, these embodiments leverage the deployment flexibility brought in by the virtualized implementation of gNB networking. With the gNB CU-CP, CU-UP, and DU implemented in the VNF manner disclosed herein, it is possible to distribute and/or aggregate these VNFs in various combinations, such as 1) a fully integrated deployment with all CU-CP, CU-UP, and DU be deployed in a single physical node, 2) a dual-node deployment with CU-CP and CU-UP on one physical node, while DU on another, or 3) completely physical node transparent deployment with CU-CP, CU-UP, and DU deployed anywhere within a cloud.

In the example of FIG. 2, the gNodeB 200 is coupled to a DMS 210 that includes a DM-EM 212 for service management, a DMS-SO 214 to manage orchestration, and a central controller 215 which executes software (e.g., StarlingX) to serve the virtualization infrastructure orchestration/management functions. The DMS 210 utilizes IPSec tunnels established by an entity of the enterprise network 230 to communicate with various elements implemented on at least one enterprise network 230. As shown in FIG. 2, those elements comprise one or more CU VNFs 232 that include at least one CU-CP 116 and at least one CU-UP 118, each of which includes an IPsec client. Also, there may be implemented on the enterprise network 230 one or more supporting virtual network functions (VNFs) 240, which may include at least a VNF service orchestration/management master VNF 242, log collection VNF 244, and an image repository VNF 246. The DMS 210 may include, or otherwise be coupled to, an OAM secure gateway 220 (for example, a VPN gateway) that establishes an O1 IPSec tunnel 222 to the CU VNFs 232. A corresponding IPsec virtual gateway (VGW) 234 is implemented to establish an endpoint for the O1 IPSec tunnel 222 for the CU VNFs 232. Similarly, the secure gateway 220 establishes an O2 IPSec tunnel 224 to the supporting VNFs 240. A corresponding IPsec VGW 248 is implemented to establish an endpoint for the O2 IPSec tunnel 224 for the supporting VNFs 240.

FIG. 2 also illustrates the option of CU VNFs 232 further comprising a VGW 249 for optionally implementing an additional F1 IPsec tunnel 254 with a VGW 336 of the DU 105, as will be discussed below with respect to FIG. 3. In some embodiments, a single VGW may be used in place of VGW 249 and VGW 234 for the O1 IPsec 222 and F1 IPsec 254. In some embodiments, the O1 IPsec 222 may also carry logging traffic as a design option. IPSec tunnels are implemented between the one or more CU-CP 116 and CU-UP 118 and an operator core network 260 of the entity that operates the gNodeB 100. In FIG. 2, the operator core network 260 communicates with the CU-CP 116 via an X2 IPSec tunnel 250 and with the CU-UP 118 via an S1/X2 IPSec tunnel 252. In some embodiments, the operator core network 260 comprises a security gateway (SecGW) core 262 for implementing the X2 IPSec tunnel 250 and S1/X2 IPSec tunnel 252. In summary, the O2 IPsec tunnel 224 is established and utilized for infrastructure and service orchestration, the O1 IPsec tunnel 222 is established and utilized for service configuration, logging, and virtual event streaming (VES) events, and the X2 IPsec tunnel 254 and S1/X2 IPsec tunnel 252 is utilized for gNodeB operations.

As illustrated in FIG. 3, the DMS 210 utilizes IPSec tunnels to further communicate with one or more DU VNFs 332. The DMS 210 includes, or is otherwise coupled to, the secure gateway 220 that further establishes an O1 IPSec tunnel 322 to the DU VNFs 332. A corresponding IPsec VGW 334 is implemented to establish an endpoint for the O1 IPSec tunnel 322 for the DU VNFs 332. Similarly, the secure gateway 220 establishes an O2 IPSec tunnel 224 to the supporting VNFs 240. A corresponding IPsec VGW 248 is implemented to establish an endpoint for the O2 IPSec tunnel 224 for the supporting VNFs 240. An F1 IPSec tunnel 350 is also optionally implemented between the one or more CU VNFs 232 (e.g., CU-CP 116 and/or CU-UP 118) and the DU VNFs 332. An IPsec VGW 336 is implemented to establish an endpoint for the F1 IPSec tunnel 350 for the DU VNFs 332, and a corresponding IPsec VGW 249 is implemented to establish an endpoint for the F1 IPSec tunnel 254 for the CU VNFs 232. The DU VNFs 332 may comprise a first IPsec VGW 336 to establish the F1 IPSec tunnel 254 and a second IPsec VGW 334 to establish the O1 IPSec tunnel 322. In summary, the O2 IPsec tunnel 224 is established and utilized for infrastructure and service orchestration, the O1 IPsec tunnel 322 is utilized for service configuration, logging, and virtual event streaming (VES) events, and the optional F1 IPsec tunnel 254 is utilized for communications between the DU 105 and the CU 102 (e.g., CU-CP 116).

Figure 4:
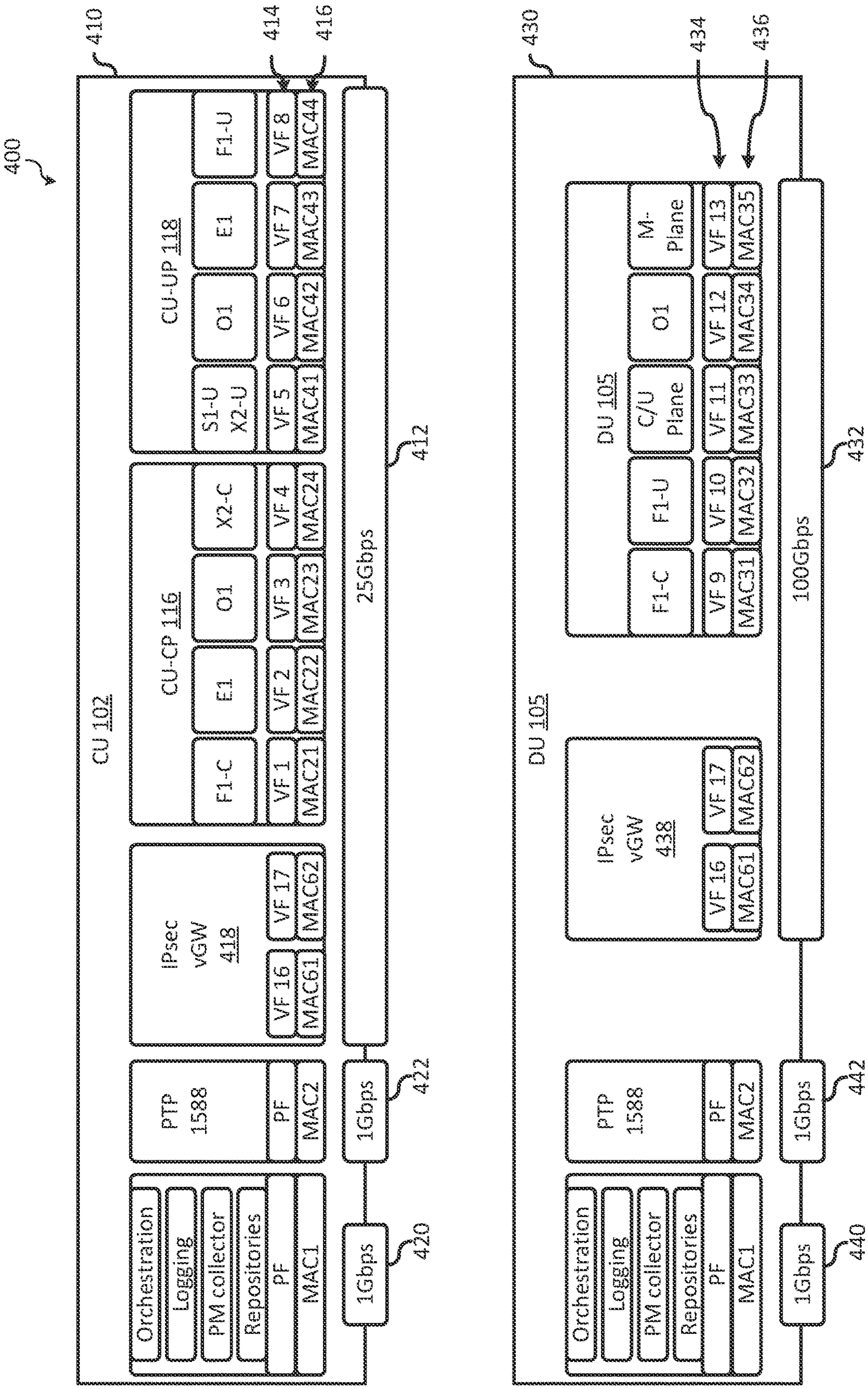

FIG. 4 is a diagram of a gNB example embodiment 400 that includes a first controller 410 configured as cloud worker node 122 to implement the CU 102 as a virtualized entity 126. In this particular case, the CU-CP 116 and CU-UP 118 are deployed within the CU 102 in the edge cloud 115. In one embodiment, the first controller 410 functions as a Kubernetes master and gNB CU node hosting the CU-CP 116 and CU-UP 118. A second controller 430 is configured as cloud worker node 122 to implement the DU 105 as a virtualized entity 126 deployed within the edge cloud 115. In one embodiment, the second controller 430 functions as Kubernetes workers and the gNodeB DU node (s) hosting the DU 105. In this embodiment, the controller 410 and controller 430 hardware platforms each include three physical network interfaces.

The first controller 410 includes a 25 Gbps physical network interface 412 implementing a SR-IOV (single root I/O virtualization) capability network interface. For each gNB major function interface traffic performed by the CU-CP 116 and CU-UP 118 (including X2-C/U, S1-U, F1-C/U, E1, O1, as well as eCPRI), the physical network interface 412 is logically subdivided to include a respective independent virtual network interface (VFs in SR-IOV terminology), shown at 414, each established with their own respective virtual MAC address, shown at 416. More specifically, the 25 Gbps SR-IOV capable physical network interface 412 is configured with a required number of virtual network interfaces 414. In the particular example of FIG. 4, 10 VF are shown and used as follows: For the IPsec virtual gateway VNF 418 (which may correspond to VGW 249, 234, or the combination of both), VF17 is allocated for use by the VNF as the IPsec tunnel interface, and VF16 is used by the IPsec virtual gateway VNF as an internal sub-net interface. For the CU-CP VNF 116, VF1 is used for CU-CP F1-C traffic, VF2 is used for CU-CP E1 traffic, VF3 is used for CU-CP O1 traffic, and VF4 is used for CU-CP X2-C traffic. For the CU-UP VNF 118, VF5 is used for CU-UP X2-U/S1-U traffic, VF6 is used for CU-UP O1 traffic, VF7 is used for CU-UP E1 traffic, and VF8 is used for CU-UP F1-U traffic. The first controller 410 also includes two 1 Gbps physical network interfaces 420 and 422 that may optionally include SR-IOV capability network interfaces. The physical network interface 420 is used to establish CU node communications for gNB infrastructure and service orchestration (such as gNB virtual infrastructure management (VIM) and virtual network function management (VNFM)), logging, performance monitoring (PM) and repository and O2 traffic, while the physical network interface 422 supports other CU functions, such as PTP/1588 timing service traffic.

The second controller 430 includes a 100 Gbps physical network interface 432 implementing a SR-IOV capability network interface. For each gNB major function interface traffic performed by the DU 105 (including F1-C/U O1, C/U plane, and M-plane), the physical network interface 432 is logically subdivided to include a respective virtual network interface (VF), shown at 434, each established with their own respective virtual MAC address, shown at 436. More specifically, the 100 Gbps SR-IOV capable physical network interface 432 is configured with a number of virtual network interfaces 434. In the particular example of FIG. 4, 7 VF are shown and used as follows: For the IPsec virtual gateway VNF 438, VF17 is used by the IPsec tunnel interface, and VF16 is used by the IPsec virtual gateway VNF as the internal sub-net interface. For the DU VNF 105, VF9 is used for DU F1-C traffic, VF10 is used for DU F1-U traffic, VF11 is used for RU C/U-plane (control/user plane) traffic, VF12 is used for DU O1 traffic, and VF13 is used for RU M-plane (management-plane) traffic.

The second controller 430 also includes two 1 Gbps physical network interfaces 440 and 442 that may optionally include SR-IOV capability network interfaces. The physical network interface 440 is used for gNB infrastructure and service orchestration (such as gNB virtual infrastructure management (VIM) and virtual network function management (VNFM)), logging, performance monitoring (PM), and repository and O2 traffic, while the physical network interface 442 supports other DU functions, such as PTP/1588 timing service traffic.

Figure 4A:
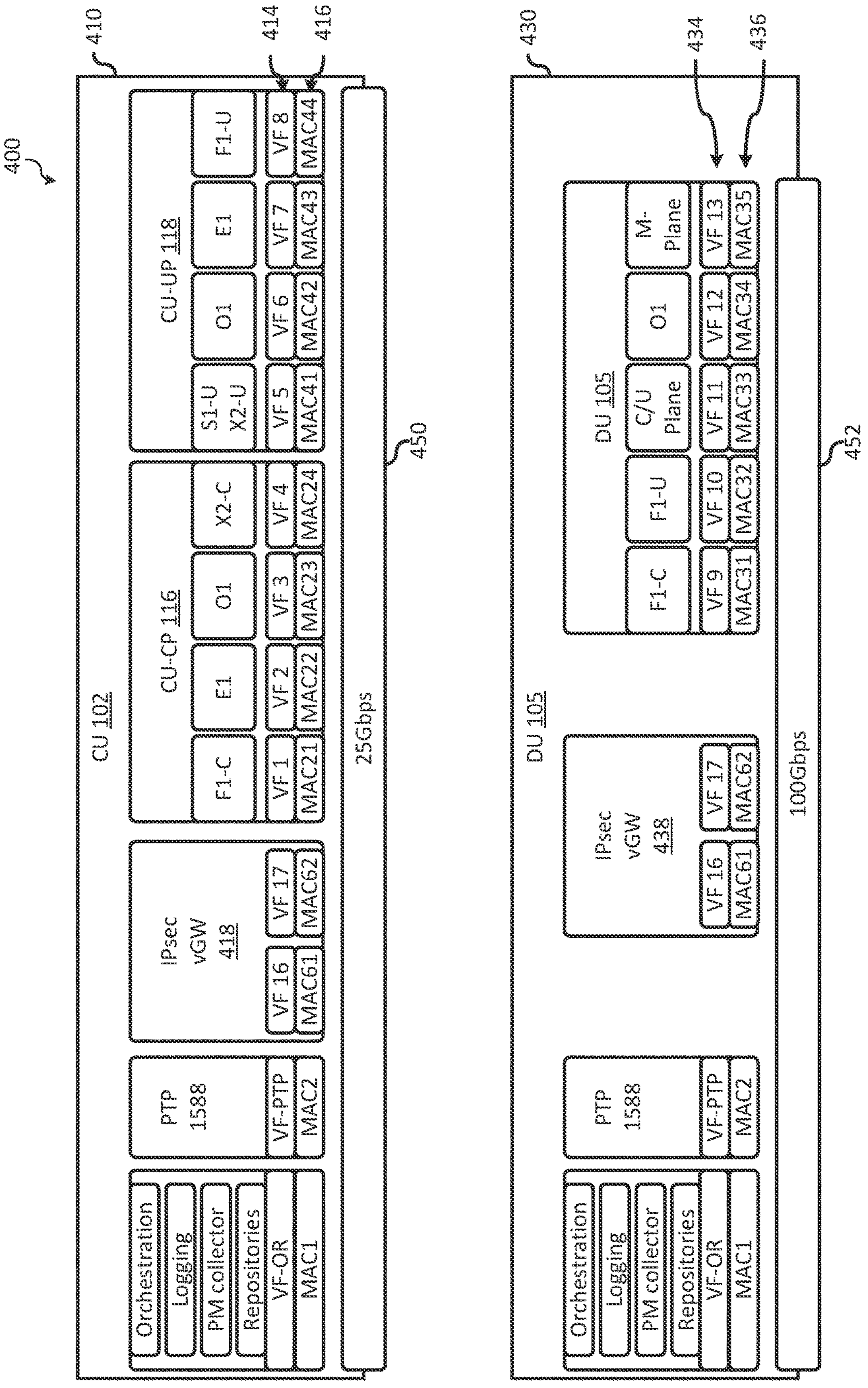

FIG. 4A is a diagram of an alternate gNB example embodiment such as in FIG. 4, except that the first controller 410 and second controller 430 each include respective physical network interfaces 450 and 452 implementing an SR-IOV capability network interface that replaces the three physical network interfaces for each controller shown in FIG. 4. For the first controller 410, the two 1 Gbps physical network interfaces 420 and 422 are omitted, and, in their place, the physical network interface 450 is further logically subdivided to include a respective virtual network interface (VF) 414, VF-OR, used for orchestration, logging, performance monitoring (PM) and repository and O2 traffic, and VF 414, VF-PTP is used for PTP/1588 timing service traffic. For the second controller 430, the two 1 Gbps physical network interfaces 440 and 442 are omitted, and, in their place, the physical network interface 452 is further logically subdivided to include a respective virtual network interface (VF) 434, VF-OR, used for orchestration, logging, performance monitoring (PM) and repository and O2 traffic, and VF 434, VF-PTP, is used for PTP/1588 timing service traffic.

It is also worth noting that in some embodiments, the IPsec virtual gateway VNFs in the CU node 102 and DU node 105 may be utilized for aggregating internal termination points that need to communicate with peer entities through IPsec tunnels. The number of IPsec virtual gateway instances to be deployed can be as many as desired, and their respective binding network interfaces can also be different depending on needs.

Figure 5A:
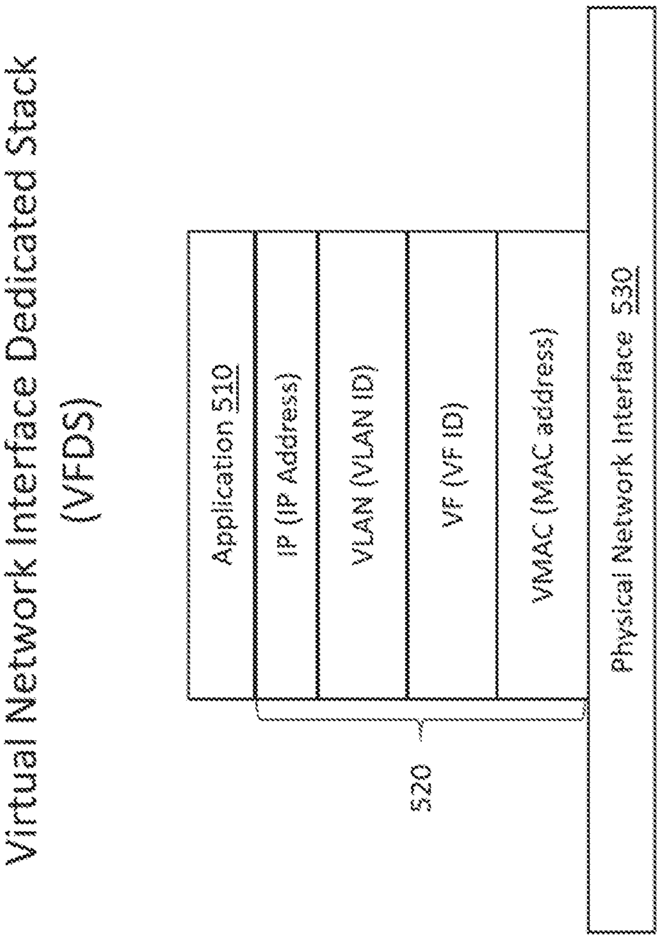
Figure 5B:
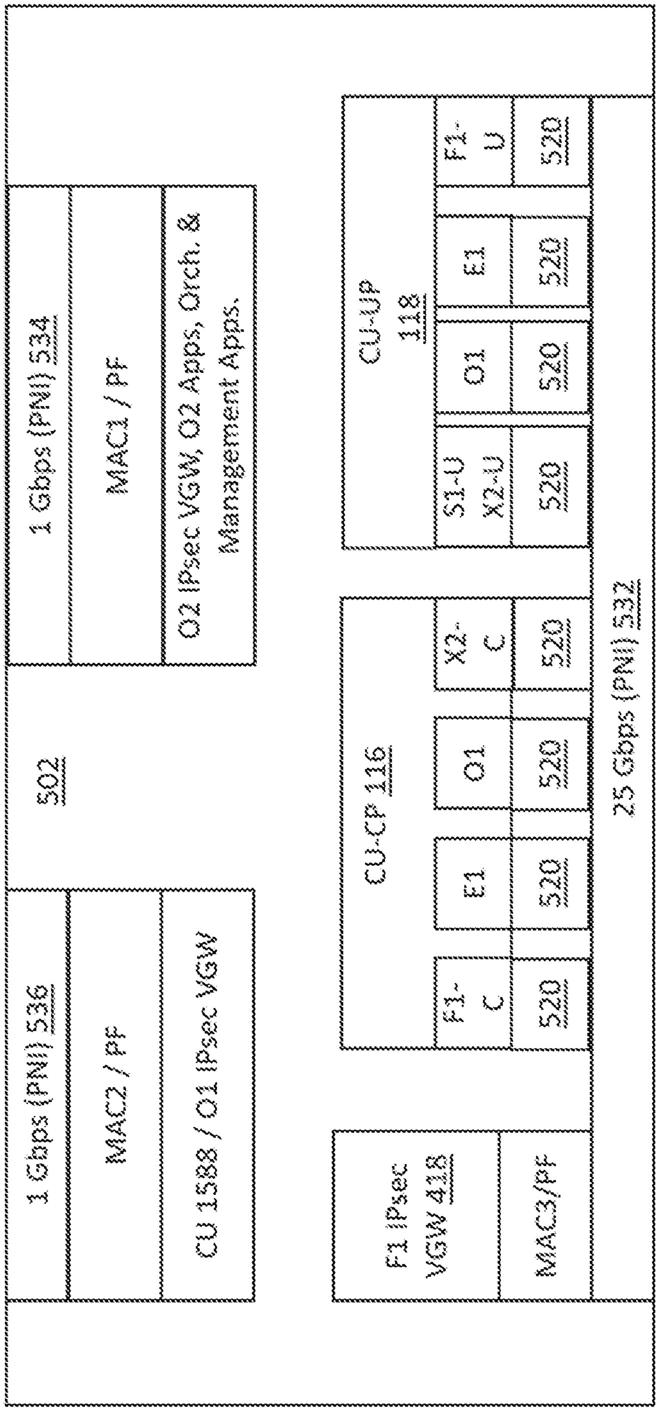
Figure 5C:
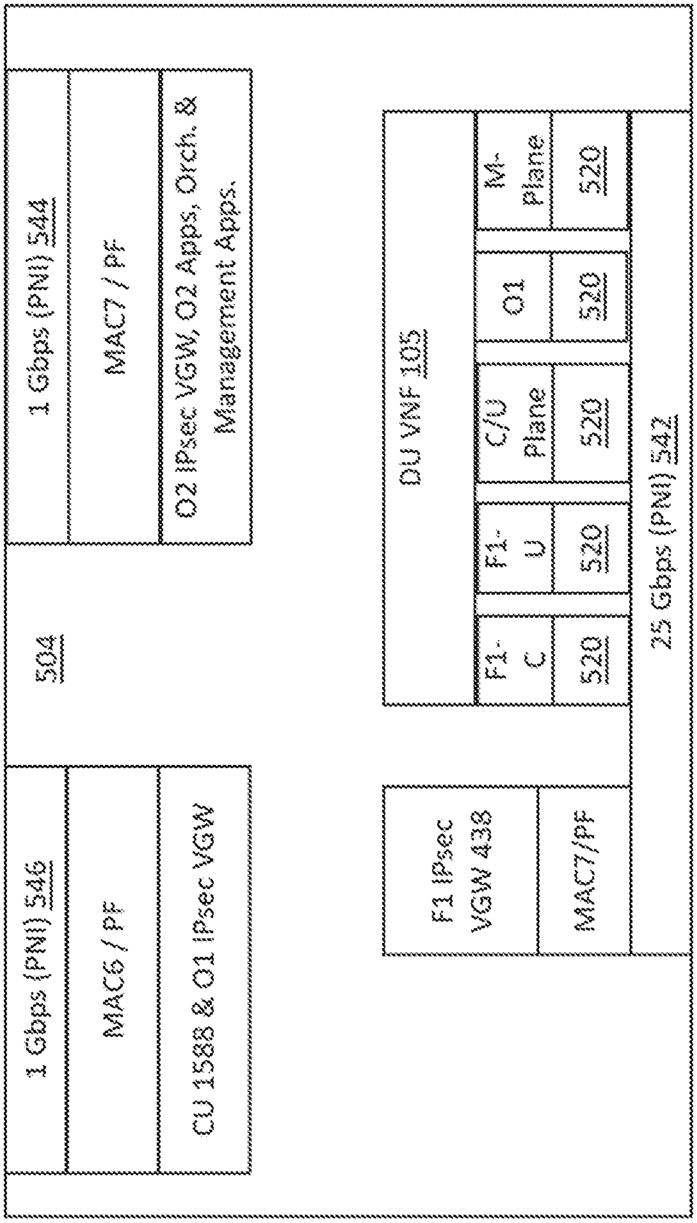

FIGS. 5A, 5B, and 5C illustrate an example embodiment of gNB networking with internal and external entities. In this example, 3 IPsec virtual gateway instances are implemented, respectively, for O2, O1, and F1 traffic, but it is understood that in other embodiments, different combinations of IPsec virtual gateway instances may be used. Moreover, each network interface functional application implemented on the various VNFs is independently bound to a physical network interface by a virtual network interface dedicated stack (VFDS). This is illustrated in FIG. 5A, where a network interface for a functional application 510 (such as an X2-C/U, S1-U, F1-C/U, E1, O1 application, or any of the other applications discussed herein) is interfaced with a VFDS 520 that binds the functional application 510 to a physical network interface 530. While the functional applications for a VNF may all be configured through their respective VFDS 520 to share a common physical network interface 530, for other embodiments, it should be understood that different VFDSs 520 associated with functional applications 510 of the same VNF need not share a common physical network interface 530, but may instead be bound to a plurality of different physical network interfaces 530.

FIG. 5B illustrates the utilization of VFDSs 520 in conjunction with the VNFs for a CU 102 node implemented on a controller 502. On this node, over the physical network interface 532 (for example, a 25 Gbps ethernet interface), there are three VNFs, the CU-CP VNF 116, the CU-UP VNF 118, and the F1 IPsec virtual gateway VNF 418. Over the physical network interface 534 (for example, a 1 Gbps ethernet interface), there are VNFs, including Orchestration and management VNF(s), an O2 IPsec virtual gateway VNF, and other miscellaneous O2 application VNF(s) such as for logging, performance monitoring, repository, and the like. Over the physical network interface 536 (for example, a second 1 Gbps ethernet interface), there are VNFs, including a PTP/1588 timing service VNF and an O1 IPsec virtual gateway VNF.

FIG. 5C illustrates the utilization of VFDSs 520 in conjunction with the VNFs for a DU 105 node implemented on a controller 504. On this node, over the physical network interface 542 (for example, a 25 Gbps ethernet interface), there are two VNFs, the DU VNF 105 and the F1 IPsec virtual gateway VNF 438. Over the physical network interface 544 (for example, a 1 Gbps ethernet interface), there are VNFs, including Orchestration and management VNF(s), and other miscellaneous O2 application VNF(s) such as for logging, performance monitoring, repository, and the like. Over the physical network interface 546 (for example, a second 1 Gbps ethernet interface), there are VNFs, including a PTP/1588 timing service VNF and an O1 IPsec virtual gateway VNF.

With respect to the function and purpose of the IPsec virtual gateway instances, the O2 IPsec virtual gateway on the CU node is for aggregating internal O2 sub-net traffic and connecting to the external orchestration and VNFM functions via the O2 IPsec tunnel. The O1 IPsec virtual gateway on the CU node is for aggregating internal CU-CP and CU-UP VNFs O1 sub-net traffic and connecting to the external OAM functions via the O1 IPsec tunnel, the O1 IPsec virtual gateway on the DU node is for aggregating internal DU VNF(s) O1 sub-net traffic and connect to the external OAM functions via the O1 IPsec tunnel. The F1 IPsec virtual gateway on the CU and DU nodes is for delivering F1-U and F1-C1 traffic between the CU and DU VNFs through the F1 IPsec tunnel.

FIGS. 6A-6I are diagrams illustrating the implementation of VLANs with the VLAN ID, VMAC, and IP address assignment for the network interface virtual functions (VFs) for the functional applications 510 of gNodeB 500 utilizing VFDS 520. As shown in these figures, for any VLAN, the nodes may comprise combinations of both virtual network interfaces as well as the physical functions (PFs).

Figure 6B:
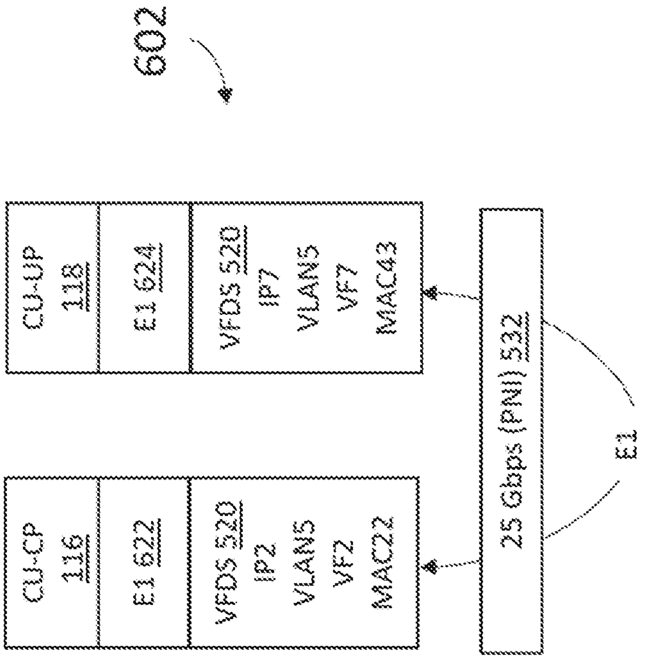
FIGS. 6A-6I are diagrams illustrating VLAN implementations for a virtualized base station utilizing virtual network interface dedicated stacks.
Figure 6A:
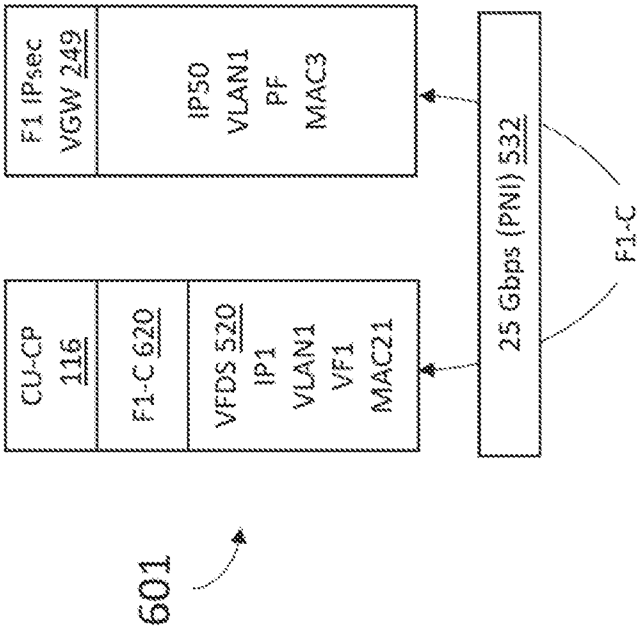

Starting with FIG. 6A, a VLAN 601 (identified as VLAN1) includes as nodes the F1-C functional application 620 for CU-CP 116 and the F1 IPsec VGW 249. The F1-C functional application is coupled to the physical network interface 532 by a VFDS 520 that allocates to the VF1 for the F1-C functional application 620 an IP address (IP1), a VLAN ID (VLAN1), and a VMAC address (MAC21). The F1 IPsec VGW 249 utilizes a physical network interface (PF) assigned an IP address (IP50), the VLAN ID (VLAN1), and a MAC address (MAC21). The F1-C traffic between these VNFs is via unsecured network connections.

In FIG. 6B, a VLAN 602 (identified as VLAN5) includes as nodes the E1 functional application 622 for CU-CP 116 and the E1 functional application 624 for CU-UP 118. The E1 functional application 622 is coupled to the physical network interface 532 by a VFDS 520 that allocates to the VF2 for E1 functional application 622 an IP address (IP2), a VLAN ID (VLAN5), and a VMAC address (MAC22). The E1 functional application 624 is coupled to the physical network interface 532 by a VFDS 520 that allocates to the VF7 for E1 functional application 624 an IP address (IP7), a VLAN ID (VLAN5), and a VMAC address (MAC43). The E1 traffic between these VNFs is via unsecured network connections.

Figure 6C:
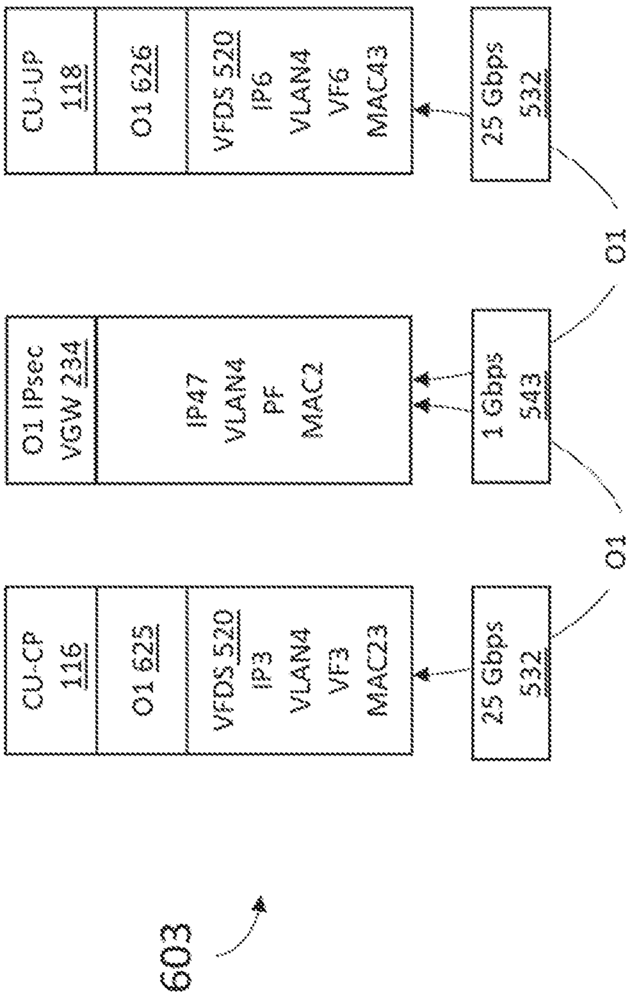

In FIG. 6C, a VLAN 603 (identified as VLAN4) includes as nodes the O1 functional application 625 for CU-CP 116, the O1 IPsec VGW 234, and the O1 functional application 626 for CU-UP 118. The O1 functional application 625 is coupled to the physical network interface 532 by a VFDS 520 that allocates to the VF3 for the O1 functional application 625 an IP address (IP3), a VLAN ID (VLAN4), and a VMAC address (MAC23). The O1 IPsec VGW 234 utilizes interface 542 as a physical network interface (PF) assigned an IP address (IP47), the VLAN ID (VLAN4), and a MAC address (MAC2). The O1 functional application 626 is coupled to the physical network interface 532 by a VFDS 520 that allocates to the VF6 for the O1 functional application 626 an IP address (IP6), a VLAN ID (VLAN4), and a VMAC address (MAC43). The O1 traffic between these VNFs is via unsecured network connections.

Figure 6D:
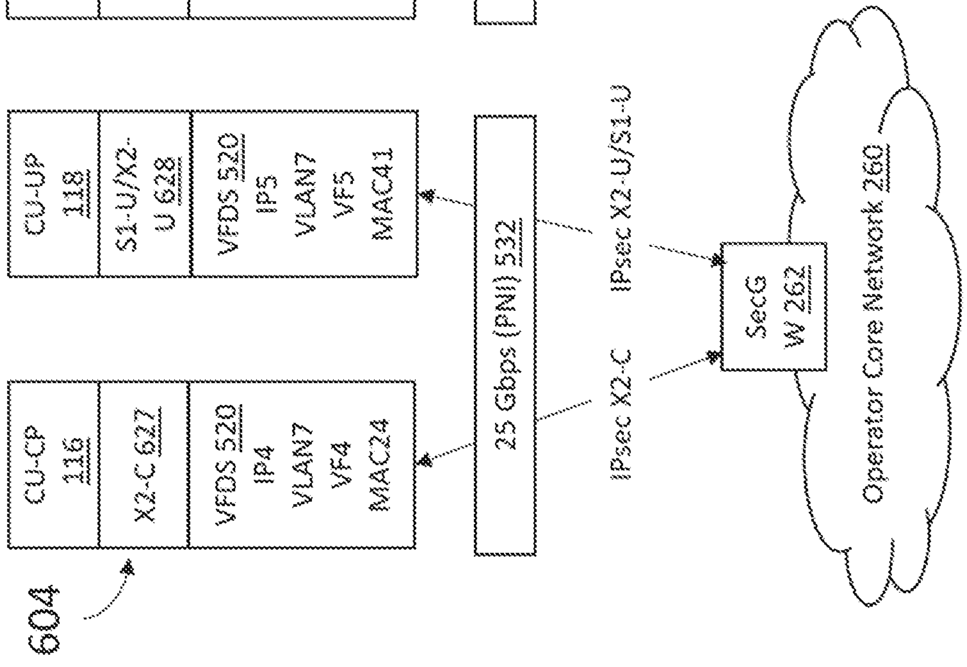

In FIG. 6D, a VLAN 604 (identified as VLAN7) includes as nodes the X2-C functional application 627 for CU-CP 116, the S1-U/X2-U functional application 628 for CU-UP 118, and the SecGW 262 of the Operator Core Network 260. The X2-C functional application 627 is coupled to the physical network interface 532 by a VFDS 520 that allocates to the VF4 for X2-C functional application 627 an IP address (IP4), a VLAN ID (VLAN7), and a VMAC address (MAC24). The X2-C/S1-U functional application 628 is coupled to the physical network interface 532 by a VFDS 520 that allocates to the VF5 for X2-C functional application 628 an IP address (IP45, a VLAN ID (VLAN7), and a VMAC address (MAC41). The X2-C and X2-U/S1-U traffic over this VLAN is secured through the IPsec tunnel with the SecGW 262. In some embodiments, the eNB 280 may also be coupled to the SecGW 262 to communicate X2-C/U traffic within this VLAN.

Figure 6E:
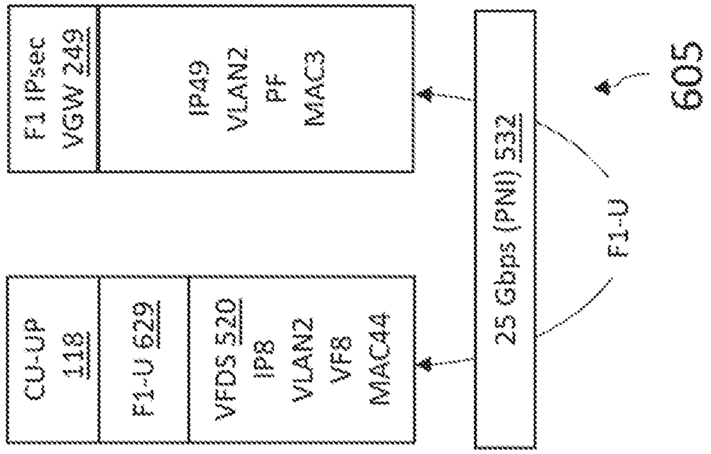

In FIG. 6E, a VLAN 605 (identified as VLAN2) includes as nodes the F1-U functional application 629 for CU-UP 118 and the F1 IPsec VGW 249. The F1-U functional application is 629 coupled to the physical network interface 532 by a VFDS 520 that allocates to the VF8 for the F1-U functional application 629 an IP address (IP8), a VLAN ID (VLAN2), and a VMAC address (MAC44). The F1 IPsec VGW 249 is coupled to interface 532 utilizing a physical network interface (PF) assigned an IP address (IP49), the VLAN ID (VLAN2), and a MAC address (MAC3). The F1-U traffic between these VNFs is via unsecured network connections.

Figure 6F:
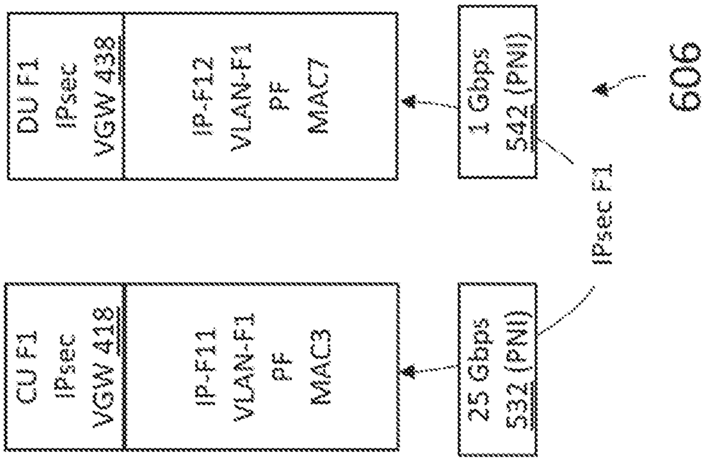

In FIG. 6F, a VLAN 606 (identified as VLAN-F1) includes as nodes the CU F1 IPsec VGW 418 and the DU F1 IPsec VGW 438. The F1 IPsec VGW 418 is coupled to the physical network interface 532 of the controller 502 utilizing a physical network interface (PF) assigned an IP address (IP-F11), the VLAN ID (VLAN-F1), and a MAC address (MAC3). The F1 IPsec VGW 438 is coupled to the physical network interface 542 of the controller 504 utilizing a physical network interface (PF) assigned an IP address (IP-F12), the VLAN ID (VLAN-F1), and a MAC address (MAC7). The F1 traffic over this VLAN is secured through an IPsec tunnel.

Figure 6H:
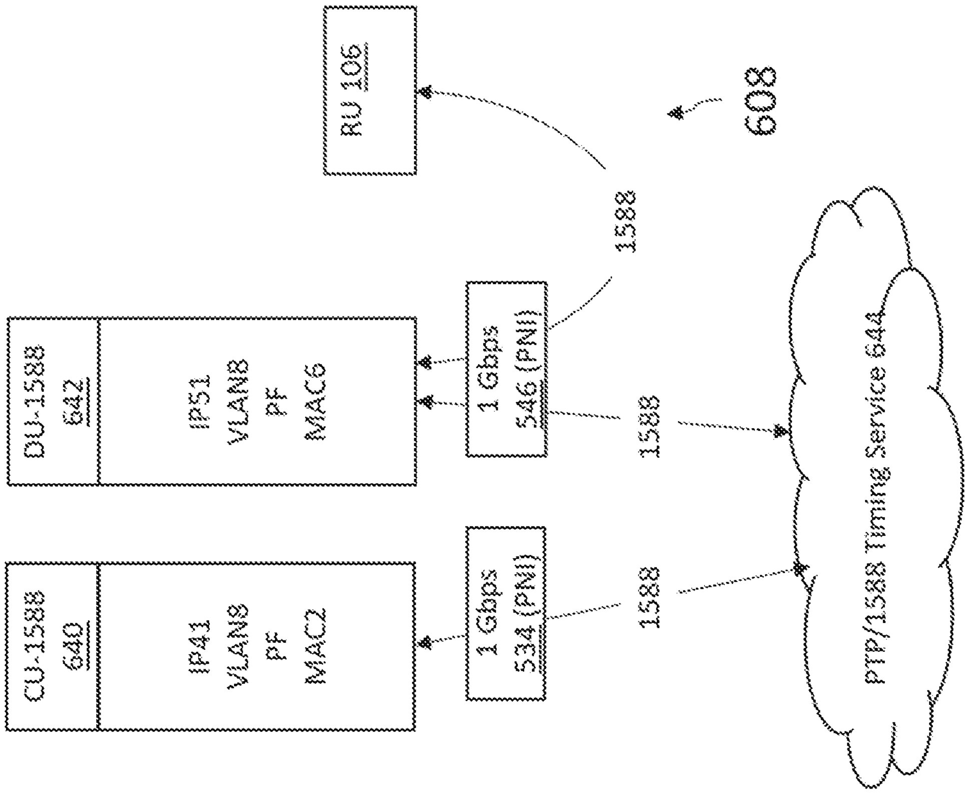
Figure 6G:
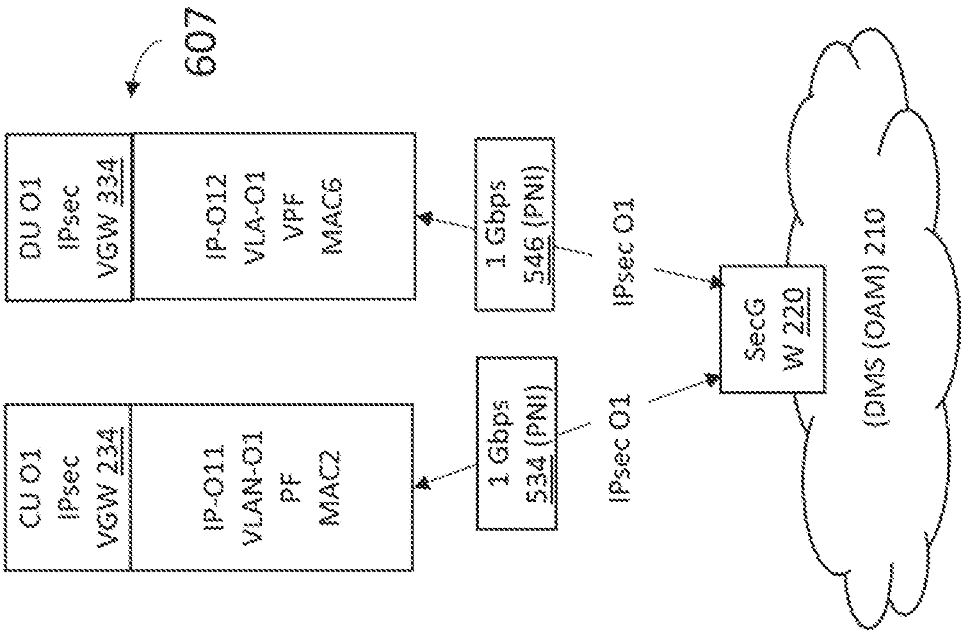

In FIG. 6G, a VLAN 607 (identified as VLAN-O1) includes as nodes the CU O1 IPsec VGW 234, the DU O1 IPsec VGW 334, and the SecGW 220 of the DMS 210. The O1 IPsec VGW 234 is coupled to the physical network interface 534 of the controller 502 utilizing a physical network interface (PF) assigned an IP address (IP-F12), the VLAN ID (VLAN-O1), and a MAC address (MAC2). The O1 IPsec VGW 334 is coupled to the physical network interface 546 of the controller 504 utilizing a physical network interface (PF) assigned an IP address (IP-O12), the VLAN ID (VLAN-O1), and a MAC address (MAC6). The O1 traffic over this VLAN is secured through the IPsec tunnel with the SecGW 220.

In FIG. 6H, a VLAN 608 (identified as VLAN-8) includes as nodes the CU's 1588 timing service application 640, the DU's 1588 timing service application 642, one or more of the RU 106, and the PTP/1588 Timing Service 644. The timing service application 640 is coupled to the physical network interface 534 of the controller 502 utilizing a physical network interface (PF) assigned an IP address (IP41), the VLAN ID (VLAN8), and MAC address (MAC2). The timing service application 642 is coupled to the physical network interface 546 of the controller 504 utilizing a physical network interface (PF) assigned an IP address (IP51), the VLAN ID (VLAN8), and MAC address (MAC6). The F1-U traffic between these VNFs is via unsecured network connections. Moreover, timing information received by the timing service application 642 may be shared on this VLAN with the RU 106 via unsecured network connections.

Figure 6I:
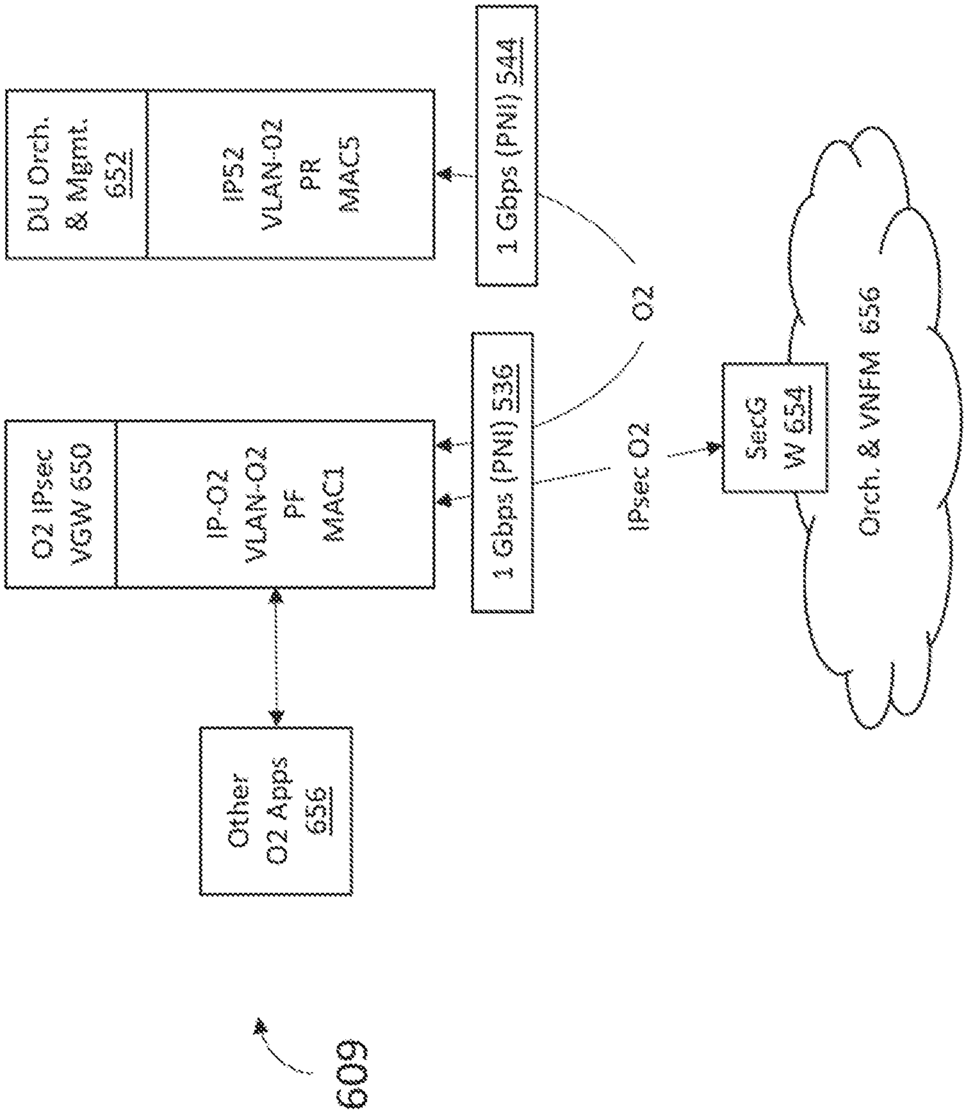

In FIG. 6I, a VLAN 609 (identified as VLAN-O2) includes as nodes the CU O2 IPsec VGW 650, the DU orchestration and management applications 652, and SecGW 654 coupled to orchestration and VNF manager (VNFM) applications 656 (which may correspond to one or more of the VNF service orchestration/management master VNF 242, log collection VNF 244, and an image repository VNF 246 introduced above). In some embodiments, other O2 applications 656 hosted on the controller 502 may be in communication with the CU O2 IPsec VGW 650. The CU O2 IPsec VGW 650 is coupled to the physical network interface 536 of the controller 502 utilizing a physical network interface (PF) assigned an IP address (IP-O2), the VLAN ID (VLAN-O2), and MAC address (MAC1). The DU orchestration and management applications 652 are coupled to the physical network interface 544 of the controller 504 utilizing a physical network interface (PF) assigned an IP address (IP-52), the VLAN ID (VLAN-O2), and MAC address (MAC5). The O2 traffic over this VLAN between the CU O2 IPsec VGW 650 and SecGW 654 is secured through the IPsec O2 tunnel, while the O2 traffic between the CU O2 IPsec VGW 650 DU orchestration and management applications 652 is via unsecured network connections.

Utilization of a virtual network interface dedicated stack (VFDS) as described above for each functional application implemented by a VNF provides a structure for coordinating the operation of VNFs belonging to multiple different gNBs on share controller hardware by using the VLANs to distinguish traffic flows belonging to different application instances for different gNB to share the common hardware of the scalable cloud environment and facilitates scalability. In addition, security is enhanced by the separation of functional application data traffic achieved by the distinct IP address, VLAN, VMAC, and VF allocated to each functional application through the implementation of the VFDS to bind the functional application to a physical network port.

For example, 5G NR virtualized functions are packaged as the CU-CP, CU-UP, and DU VNFs, as discussed above. VNFs, as orchestrated on the hardware controllers of the scalable cloud environment, are often referred to as "pods." In a particular Edge Deployment, multiple gNBs such as those disclosed above can be deployed, for example, with each gNB having a CU-CP, one to four CU-UP, one to four DUs, and from one to eight RUs per each DU.

With one or more of the embodiments described herein, in order to deploy each of these VNFs in the edge cloud infrastructure, the VNF entities are named according to a naming policy in a structured fashion that avoids name conflicts in case of multiple gNB deployments within the edge cloud and/or on shared controllers. The naming policy also provides an implicit way to identify each VNF entity for easier management/troubleshooting. These embodiments include the auto-generation of internal VLAN IDs, IP addresses, Kubernetes (k8s) service names, and service ports. In 5G gNB solutions, there are 3 pods being deployed in the k8s environment, namely CU-CP, CU-UP, and DU. Containers in a pod define the functional applications discussed above that are in need of VLAN assignments to communicate with different entities. Example themes that may be used to auto-generate the parameters for orchestrating gNB pods are shown in Table 1 below:

TABLE 1

| Entity | Theme used to arrive at name |
| --- | --- |
| K8S Namespace | gNodeB ID |
| VLAN ID | Internal Traffic carrying VLAN' s static value starts from 10. External Traffic carryingVLANs to be provided by core network operator. |
| Virtual network interfaces | net<TrafficType> example interface "netx2c" refer to interface carrying x2 |
| K8s Deployment Name (Pod Name Prefix) | CU-CP/CU-UP/DU Identifier. Deployment Name Format: <CU-CP/CU-UP/DU Identifier> Pod Name Format: <CU-CP/CU-UP/DU Identifier> <k8s generated unique id for aninstance> |
| K8s Service Names | <CU-CP/CU-UP/DUdeployment>-<Traffic Type> For example CU-CP deployment name is "cs-gnbcucp" and for F1C Traffic then the service name shall be: "cs-gnb-cucpf1c" |
| Service Port | For the traffic that uses additional interface instead of K8s default interface, well known ports defined by standards as per the protocol are used. Only for the services that are exposed in a native k8s way, Node ports are generated |

With respect to the namespace, a single unique namespace can be used per each gNB implemented in an edge cloud. For example, a gNB comprising of 1 CU-CP, one or more CU-UP, and one or more DUs, can be identified by one namespace (for example, of the form gNBid1, gNBid2, and so forth) generated based on the core network operator provided gNB ID for the gNB, while another namespace is used for another gNB comprising of 1 CU-CP, one or more CU-UP, and one or more DUs. For the purpose of the following discussion, a gNB is assumed to refer to a gNB having the combination of 1CU-CP and related associations of 1 CU-CP, 2 CU-UP, and 4 DUs. However, embodiments of gNBs are not as limited as other embodiments and may comprise these VNFs with other configurations.

With respect to virtual network interface (VF) names, SR-IOV networks may be created, for example, using the DAMN Meta CNI plugin. A CNI plugin is responsible for inserting a network interface into the container network namespace. Using DAMN cluster networks, the SR-IOV device pool, VLAN ID, interface prefix, an IP subnet can each be associated with elements of the VNFs and VFDS discussed above. When the VNF subsequently gets attached to the network, interface names are generated by indexing. When the pod gets attached to the network, interface name is generated for a DU VNF 105, CU-CP VNF 116 and CU-UP VNF 118 as shown by example in the respective tables 2, 3 and 4 below.

TABLE 2

| DU VNF | | |
| --- | --- | --- |
| Traffic | Pod Interface Name to use | VLAN |
| F1-C | netf1c | F1-C |
| F1-U | netdpdk | F1-U |
| RU C plane | netoranc | C PLANE |
| RU U plane | netoranu | U PLANE |
| RU M plane | netoranm | M PLANE |
| O1 | neto1c | O1 |

TABLE 3

| CU-UP VNF | | |
|---|---|---|
| Traffic | Pod Interface Name to use | VLAN |
| F1-U | netdpdk | S1-U |
| S1-U/X2-U | netdpdk | S1-U |
| E1 | nete1c | E1 |
| O1 | neto1c | O1 |

TABLE 4

| CU-CP VNF | | |
|---|---|---|
| Traffic | Pod Interface Name to use | VLAN |
| F1-C | netf1c | F1-U |
| X2-C | netx2c | X2-C |
| E1 | nete1c | E1 |
| O1 | neto1c | O1 |

Note that for each of the above, O1 traffic can also use the default k8s pod interface (eth0). Since O1 traffic has to go to hosted CS network, in that case, a 1G interface over OAM VLAN can be utilized.

With respect to the deployment name for the deployment of gNB VNFs, k8s deployment constructs (first class objects) may be used, where the deployment names are also the DNS sub domain names. Deployments represent a set of multiple, identical VNF pods that do not inherently have unique identities. In the gNB deployment case, a VNF deployment maps to single pod. That is, for example, a DU deployment maps to only one DU POD, a CU-UP deployment maps to only one CU-UP POD, a CU-CP deployment maps to only one CU-CP pod. Example generated deployment names for a gNB are shown in table 5 below.

TABLE 5

| VNF (Pod) | Deployment Name |
|---|---|
| CU-CP | cs-gnb-cucp |
| CP-UP | cs-gnb-cuup1, cs-gnb-cuup2, cs-gnb-cuup3, cs-gnb-cuup4 |
| DU | cs-gnb-dul, cs-gnb-du2, cs-gnb-du3, cs-gnb-du4, cs-gnb-du5, csgnb-du6,cs-gnb-du7, cs-gnb-du8 |

With respect to service names, the Kubernetes Service names may be used for DNS label names. These service names for VNF are generated based on the deployment name and traffic type. For example, for a CU-CP VNF whose deployment name is cucp0 and F1C traffic type, the service name can be cs-gnb-cucp-flc. In other words, the namespace and domain name can be appended to the service name as shown in table 6.

TABLE 6

| VNF(Pod) | Traffic | ServiceName | Service Type |
|---|---|---|---|
| CU-CP | F1C | cs-gnb-cucp-flc | Danm Headless service |
| CU-CP | X2C | <external dns name> or cs-gnb-cucpx2c | Additional interface of pod that cannot be exposed to outside k8s |
| CU-CP | O1 | <external dns name> or cs-gnb-cucpolc | Additional interface of pod that cannot be exposed to outside k8s |
| CU-CP | O1 | cs-gnb-cucp-o1c | NodePort or Loadbalancer |
| CU-CP | E1 | cs-gnb-cucp-elc | Danm Headless service |
| CU-UP | F1U | cs-gnb-cuup1-flu | Danm Headless service |
| CU-UP | S1U | <external dns name> or cs-gnbcuup1-slu | Additional interface of pod that cannot be exposed to outside k8s |
| CU-UP | X2U | <external dns name> or cs-gnbcuup1-x2u | Additional interface of pod that cannot be exposed to outside k8s |
| CU-UP | E1 | cs-gnb-cuup1-elc | Danm Headless service |
| CU-UP | O1 | <external dns name> or cs-gnbcuup1-olc | Additional interface of pod that cannot be exposed to outside k8s |
| CU-UP | O1 | cs-gnb-cuup1-o1c | NodePort or Loadbalancer |
| DU | O1 | <external dns name> or cs-gnb-du1-olc | Additional interface of pod that cannot be exposed to outside k8s |
| DU | O1 | cs-gnb-du1-o1c | NodePort or Loadbalancer |
| DU | Mplane | <internal dns name> or cucp0.du0.mplane | Additional interface of pod that cannot be exposed to outside k8s |

Regarding the VLANs and their IP address Ranges, the internal VLANS can be autogenerated prior to orchestration and one of the ports of the functional applications are orchestrated, the names and ranges allocated per the policy and the namespace associated with the gNB being deployed. Each can be sequentially generated from a VLAN ID. For the IPv4 range, the VLANS can have a third octet as VLAN ID, or the fourth hextet for IPV6 and the same VLAN are maintained across all the deployments. IPv4/IPv6 addresses of a network are sequentially assigned to VNF additional interfaces in the case where there are static IP address requirements. In case of dynamic IP addresses, the DANM IPAM may be utilized to make the IP address assignments. For M-plane communication with an RU, link local IPV6 addresses may be used where the DU and RU autogenerate those addresses. Table 7 illustrates example VLAN/IP address range assignments for various traffic types.

TABLE 7

| Traffic | VLAN | IPv6 Range | IPv4 Range |
|---|---|---|---|
| F1C | 10 | 2001:4000:aa:a::/64 | 192.168.10.0/24 |
| E1C | 11 | 2001:4000:aa:b::/64 | 192.168.11.0/24 |
| F1U | 12 | 2001:4000:aa:c::/64 | 192.168.12.0/24 |
| FH M plane | 13 | (link local IPv6) | N/A |
| FH C plane | 14 | N/A (link local IPV6) | N/A |
| FH U plane | 15 | N/A (link local IPv6) | N/A |

Figure 7:
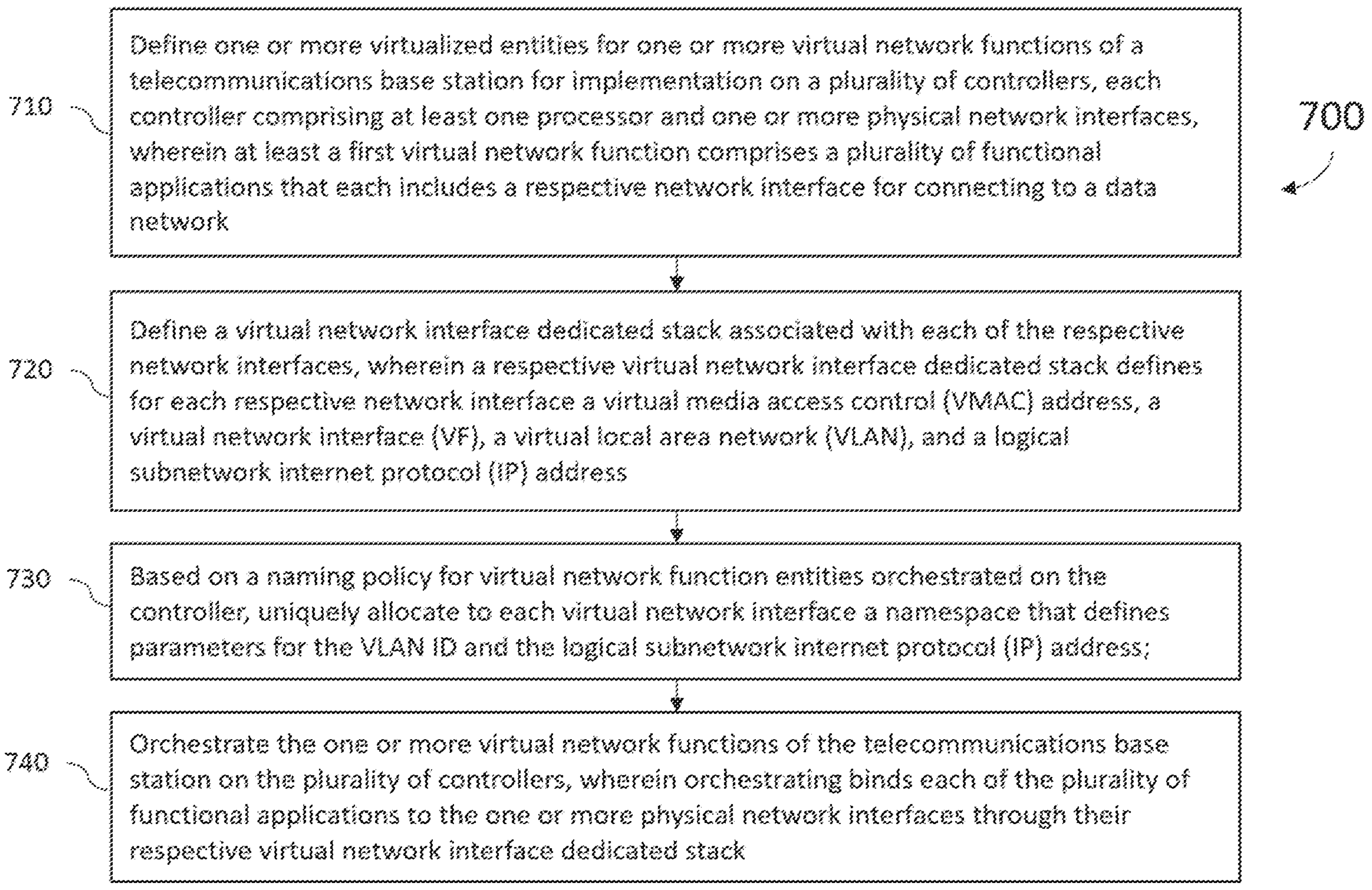
FIG. 7 is a flow chart illustrating an example method for implementing a naming policy for virtual network function entities of a virtualized wireless base station.

FIG. 7 is a flow chart diagram implementing an example method 700 for implementing a naming policy for virtual network function entities for virtualized wireless base station 100 on a VNF hosting platform. It should be understood that the features and elements described herein with respect to the method of FIG. 7 may be used in conjunction with, in combination with, or substituted for elements of any of the other embodiments discussed herein and vice versa. Further, it should be understood that the functions, structures, and other description of elements for embodiments described in FIG. 7 may apply to like or similarly named or described elements across any of the figures and/or embodiments describe herein and vice versa.

The method begins at 710 with defining one or more virtualized entities for one or more virtual network functions of a telecommunications base station for implementation on a plurality of controllers, each controller comprising at least one processor and one or more physical network interfaces. At least a first virtual network function comprises a plurality of functional applications that each includes a respective network interface for connecting to a data network. The virtual network function entities each comprises a plurality of functional applications that each includes a respective network interfaces for connecting to a data network. The virtual network function may comprise virtualized entities for one or more of a CU-CP, CU-UPs, DUs and VGWs, for example. The method proceeds to 720 with defining a virtual network interface dedicated stack associated with each of the respective network interfaces. A respective virtual network interface dedicated stack defines for each respective network interface a virtual media access control (VMAC) address, a virtual network interface (VF), a virtual local area network (VLAN), and a logical subnetwork internet protocol (IP) address. At 730, based on a naming policy for virtual network function entities orchestrated on the controller, the method uniquely allocates to each virtual network interface a namespace that defines parameters for the VLAN ID and the logical subnetwork internet protocol (IP) address. The method proceeds to 740 with orchestrating the one or more virtual network functions of the telecommunications base station on the plurality of controllers, wherein orchestrating binds each of the plurality of functional applications to the one or more physical network interfaces through their respective virtual network interface dedicated stack.

Example Embodiments

Example 1 includes a controller for a telecommunications wireless base station, the controller comprising: one or more physical network interfaces; and at least one processor programmed to execute code on the controller: one or more virtualized entities for one or more virtual network functions of a telecommunications base station, wherein at least a first virtual network function comprises a plurality of functional applications that each includes a respective network interface for connecting to a data network; and a virtual network interface dedicated stack associated with each of the respective network interfaces, wherein a respective virtual network interface dedicated stack defines for each of the plurality of network interfaces a virtual media access control (VMAC) address, a virtual network interface (VF), a virtual local area network (VLAN), and a logical subnetwork internet protocol (IP) address; wherein each of the plurality of functional applications are bound to the one or more physical network interfaces by their respective virtual network interface dedicated stack.

Example 2 includes the controller of Example 1, wherein a first functional application of the first virtual network function is coupled to a first physical network interface by a first virtual network interface dedicated stack, and a second functional application of the first virtual network function is coupled to a second physical network interface by a second virtual network interface dedicated stack.

Example 3 includes the controller of any of Examples 1-2, wherein a first functional application of the first virtual network function exchanges data traffic with a virtual network function of a second controller via the VLAN defined by the respective virtual network interface dedicated stack.

Example 4 includes the controller of any of Examples 1-3, wherein a first functional application of the first virtual network function exchanges IPsec secured data traffic with a virtual network function of a second controller via the VLAN defined by the respective virtual network interface dedicated stack.

Example 5 includes the controller of any of Examples 1-4, wherein a first functional application of the first virtual network function exchanges data traffic with a second functional application of a second virtual network function via the VLAN defined by the respective virtual network interface dedicated stack.

Example 6 includes the controller of any of Examples 1-5, wherein the first virtual network function comprises either: a gNodeB Central Unit User Plane (CU-UP) virtual network function; a gNodeB Central Unit Control Plane (CU-CP) virtual network function; or a gNodeB Distributed Unit (DU) virtual network function.

Example 7 includes the controller of any of Examples 1-6, wherein the first virtual network function implements a subset of functional applications for either: a gNodeB Central Unit User Plane (CU-UP) virtual network function; a gNodeB Central Unit Control Plane (CU-CP) virtual network function; or a gNodeB Distributed Unit (DU) virtual network function.

Example 8 includes the controller of any of Examples 1-7, wherein the first virtual network functions comprises an Ipsec virtual gateway (VGW).

Example 9 includes the controller of any of Examples 1-8, wherein the at least one processor uniquely associates each virtual network interface with a namespace that defines parameters for a VLAN ID and the logical subnetwork internet protocol (IP) address based on a naming policy for virtual network function entities orchestrated on the controller.

Example 10 includes the controller of Example 9, further comprising a second virtual network function comprising the plurality of functional applications that each includes the respective network interface for connecting to the data network; wherein the first virtual network function comprises a virtual network function for a first gNodeB wireless base station and the second virtual network functions comprises a virtual network function for a second gNodeB wireless base station.

Example 11 includes the controller of Example 10, wherein the at least one processor uniquely associates each virtual network interface for the first virtual network function for the first gNodeB wireless base station with a first namespace and associates each virtual network interface for the second virtual network function for the second gNodeB wireless base station with a second namespace.

Example 12 includes an edge cloud system for virtualized wireless base stations, the system comprising: a plurality of controllers, each controller comprising at least one processor and one or more physical network interfaces; at least one network, wherein the plurality of controllers are configured to communicate with each other over the one or more physical network interfaces via a data network; and a first controller configured to execute code to implement a first virtualized network function for a first virtualized wireless base station and implement a second virtualized network function for a second virtualized wireless base station; wherein the first virtual network function and the second virtual network function each comprise a plurality of functional applications that each includes a respective network interface for connecting to the data network; wherein the first controller is configured to execute code to implement a respective virtual network interface dedicated tack for each of the respective network interfaces, wherein a respective virtual network interface dedicated stack defines for each of the plurality of network interfaces a virtual media access control (VMAC) address, a virtual network interface (VF), a virtual local area network (VLAN), and a logical subnetwork internet protocol (IP) address; wherein each of the plurality of functional applications are bound to the one or more physical network interfaces by their respective virtual network interface dedicated stack.

Example 13 includes the system of Example 12, wherein the first controller uniquely associates each virtual network interface with a namespace that defines parameters for a VLAN ID and the logical subnetwork internet protocol (IP) address based on a naming policy for virtual network function entities orchestrated on the controller.

Example 14 includes the system of Example 13, wherein the first uniquely associates each virtual network interface for the first virtual network function with a first namespace for the first wireless base station and associates each virtual network interface for the second virtual network function with a second namespace for the second wireless base station.

Example 15 includes the system of any of Examples 12-14, wherein a first functional application of the first virtual network function exchanges data traffic with a virtual network function of a second controller via the VLAN defined by the respective virtual network interface dedicated stack.

Example 16 includes the system of any of Examples 12-15, wherein a first functional application of the first virtual network function exchanges data traffic with a functional application of a second virtual network function via the VLAN defined by the respective virtual network interface dedicated stack.

Example 17 includes the system of any of Examples 12-16, wherein the first virtual network function comprises either: a gNodeB Central Unit User Plane (CU-UP) virtual network function; a gNodeB Central Unit Control Plane (CU-CP) virtual network function; or a gNodeB Distributed Unit (DU) virtual network function.

Example 18 includes the system of any of Examples 12-17, wherein the first virtual network function comprises implements a subset of functional applications for either: a gNodeB Central Unit User Plane (CU-UP) virtual network function; a gNodeB Central Unit Control Plane (CU-CP) virtual network function; or a gNodeB Distributed Unit (DU) virtual network function.

Example 19 includes the system of any of Examples 12-18, wherein the first virtual network functions comprises an IPsec virtual gateway (VGW).

Example 20 includes a method for implementing a naming policy for virtual network function entities of a virtualized wireless base station, the method comprising: defining one or more virtualized entities for one or more virtual network functions of a telecommunications base station for implementation on a plurality of controllers, each controller comprising at least one processor and one or more physical network interfaces, wherein at least a first virtual network function comprises a plurality of functional applications that each includes a respective network interface for connecting to a data network; defining a virtual network interface dedicated stack associated with each of the respective network interfaces, wherein a respective virtual network interface dedicated stack defines for each respective network interface a virtual media access control (VMAC) address, a virtual network interface (VF), a virtual local area network (VLAN), and a logical subnetwork internet protocol (IP) address; based on the naming policy for virtual network function entities orchestrated on the controller, uniquely allocating to each virtual network interface a namespace that defines parameters for the VLAN ID and the logical subnetwork internet protocol (IP) address; and orchestrating the one or more virtual network functions of the telecommunications base station on the plurality of controllers, wherein orchestrating binds each of the plurality of functional applications to the one or more physical network interfaces through their respective virtual network interface dedicated stack.

Example 21 includes the method of Example 20, wherein the one or more virtual network functions comprise one or more of: a gNodeB Central Unit User Plane (CU-UP) virtual network function; a gNodeB Central Unit Control Plane (CU-CP) virtual network function; or a gNodeB Distributed Unit (DU) virtual network function.

Example 22 includes the method of any of Examples 20-21, wherein at least one of the one or more virtual network functions implements a subset of functional applications for either: a gNodeB Central Unit User Plane (CU-UP) virtual network function; a gNodeB Central Unit Control Plane (CU-CP) virtual network function; or a gNodeB Distributed Unit (DU) virtual network function.

Example 23 includes the method of any of Examples 20-22, wherein the one or more virtual network functions comprise at least one IPsec virtual gateway (VGW).

Example 24 includes the method of any of Examples 20-23, further comprising: associating each virtual network interface for the first virtual network function with a first namespace for a first gNodeB wireless base station; and associating each virtual network interface for a second virtual network function with a second namespace for a second gNodeB wireless base station.

In various alternative embodiments, system and/or device elements, method steps, or example implementations described throughout this disclosure (such as any of the base stations, certificate authorities, central cloud, edge cloud, cloud master and worker node, virtual network functions and virtualized entities, virtual network interface dedicated stack, central unit control-plane (CU-CP), central unit user-plane (CU-CP), and distributed units (DU), radio units, operator core, controllers, gateways, compute nodes, processor, memory, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, wireless base station related terms such as base station, central unit, distributed unit, radio units, cloud master and cloud worker nodes, controllers, processor, memory, or sub-parts thereof, refer to non-generic elements as would recognized and understood by those of skill in the art of telecommunications and networks and are not used herein as nonce words or nonce terms for the purpose of invoking 35 USC 112 (f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A controller for a telecommunications wireless base station, the controller comprising:

one or more physical network interfaces; and at least one processor programmed to execute code on the controller to implement:

one or more virtual network functions, each virtual network function in the one or more virtual network functions implementing a virtualized entity of a telecommunications base station, wherein at least a first virtual network function in the one or more virtual network functions comprises a plurality of functional applications that each includes a respective network interface for connecting to a data network; and a virtual network interface dedicated stack associated with each of the respective network interfaces, wherein a respective virtual network interface dedicated stack defines for each of the plurality of network interfaces a virtual media access control (VMAC) address, a virtual network interface (VF), a virtual local area network (VLAN), and a logical subnetwork internet protocol (IP) address;

wherein each of the plurality of functional applications are bound to the one or more physical network interfaces by their respective virtual network interface dedicated stack.

2. The controller of claim 1, wherein a first functional application of the first virtual network function is coupled to a first physical network interface by a first virtual network interface dedicated stack, and a second functional application of the first virtual network function is coupled to a second physical network interface by a second virtual network interface dedicated stack.

3. The controller of claim 1, wherein a first functional application of the first virtual network function exchanges data traffic with a virtual network function of a second controller via the VLAN defined by the respective virtual network interface dedicated stack.

4. The controller of claim 1, wherein a first functional application of the first virtual network function exchanges IPsec secured data traffic with a virtual network function of a second controller via the VLAN defined by the respective virtual network interface dedicated stack.

5. The controller of claim 1, wherein a first functional application of the first virtual network function exchanges data traffic with a second functional application of a second virtual network function via the VLAN defined by the respective virtual network interface dedicated stack.

6. The controller of claim 1, wherein the first virtual network function comprises either:

a gNodeB Central Unit User Plane (CU-UP) virtual network function;

a gNodeB Central Unit Control Plane (CU-CP) virtual network function; or a gNodeB Distributed Unit (DU) virtual network function.

7. The controller of claim 1, wherein the first virtual network function implements a subset of functional applications for either:

a gNodeB Central Unit User Plane (CU-UP) virtual network function;

a gNodeB Central Unit Control Plane (CU-CP) virtual network function; or a gNodeB Distributed Unit (DU) virtual network function.

8. The controller of claim 1, wherein the first virtual network functions comprises an IPsec virtual gateway (VGW).

9. The controller of claim 1, wherein the at least one processor uniquely associates each virtual network interface with a namespace that defines parameters for a VLAN ID and the logical subnetwork internet protocol (IP) address based on a naming policy for virtual network function entities orchestrated on the controller.

10. The controller of claim 9, further comprising a second virtual network function comprising the plurality of functional applications that each includes the respective network interface for connecting to the data network;

wherein the first virtual network function comprises a virtual network function for a first gNodeB wireless base station and the second virtual network functions comprises a virtual network function for a second gNodeB wireless base station.

11. The controller of claim 10, wherein the at least one processor uniquely associates each virtual network interface for the first virtual network function for the first gNodeB wireless base station with a first namespace and associates each virtual network interface for the second virtual network function for the second gNodeB wireless base station with a second namespace.

12. An edge cloud system for virtualized wireless base stations, the system comprising:

a plurality of controllers, each controller comprising at least one processor and one or more physical network interfaces;

at least one network, wherein the plurality of controllers are configured to communicate with each other over the one or more physical network interfaces via a data network; and a first controller configured to execute code to implement a first virtualized network function for a first virtualized entity of a first virtualized wireless base station and implement a second virtualized network function for a second virtualized entity of a second virtualized wireless base station;

wherein the first virtual network function and the second virtual network function each comprise a plurality of functional applications that each includes a respective network interface for connecting to the data network;

wherein the first controller is configured to execute code to implement a respective virtual network interface dedicated stack for each of the respective network interfaces, wherein a respective virtual network interface dedicated stack defines for each of the plurality of network interfaces a virtual media access control (VMAC) address, a virtual network interface (VF), a virtual local area network (VLAN), and a logical subnetwork internet protocol (IP) address;

wherein each of the plurality of functional applications are bound to the one or more physical network interfaces by their respective virtual network interface dedicated stack.

13. The system of claim 12, wherein the first controller uniquely associates each virtual network interface with a namespace that defines parameters for a VLAN ID and the logical subnetwork internet protocol (IP) address based on a naming policy for virtual network function entities orchestrated on the controller.

14. The system of claim 13, wherein the first uniquely associates each virtual network interface for the first virtual network function with a first namespace for the first wireless base station and associates each virtual network interface for the second virtual network function with a second namespace for the second wireless base station.

15. The system of claim 12, wherein a first functional application of the first virtual network function exchanges data traffic with a virtual network function of a second controller via the VLAN defined by the respective virtual network interface dedicated stack.

16. The system of claim 12, wherein a first functional application of the first virtual network function exchanges data traffic with a functional application of a second virtual network function via the VLAN defined by the respective virtual network interface dedicated stack.

17. The system of claim 12, wherein the first virtual network function comprises either:

a gNodeB Central Unit User Plane (CU-UP) virtual network function;

a gNodeB Central Unit Control Plane (CU-CP) virtual network function; or a gNodeB Distributed Unit (DU) virtual network function.

18. The system of claim 12, wherein the first virtual network function comprises implements a subset of functional applications for either:

a gNodeB Central Unit User Plane (CU-UP) virtual network function;

a gNodeB Central Unit Control Plane (CU-CP) virtual network function; or a gNodeB Distributed Unit (DU) virtual network function.

19. The system of claim 12, wherein the first virtual network functions comprises an IPsec virtual gateway (VGW).

20. A method for implementing a naming policy for virtual network function entities of a virtualized wireless base station, the method comprising:

defining one or more virtual network functions, each virtual network function in the one or more virtual network functions implementing a virtualized entity of a telecommunications base station for implementation on a plurality of controllers, each controller comprising at least one processor and one or more physical network interfaces, wherein at least a first virtual network function in the one or more virtual network functions comprises a plurality of functional applications that each includes a respective network interface for connecting to a data network;

defining a virtual network interface dedicated stack associated with each of the respective network interfaces, wherein a respective virtual network interface dedicated stack defines for each respective network interface a virtual media access control (VMAC) address, a virtual network interface (VF), a virtual local area network (VLAN), and a logical subnetwork internet protocol (IP) address;

based on the naming policy for virtual network function entities orchestrated on the controller, uniquely allocating to each virtual network interface a namespace that defines parameters for a VLAN ID and the logical subnetwork internet protocol (IP) address; and orchestrating the one or more virtual network functions of the telecommunications base station on the plurality of controllers, wherein orchestrating binds each of the plurality of functional applications to the one or more physical network interfaces through their respective virtual network interface dedicated stack.

21. The method of claim 20, wherein the one or more virtual network functions comprise one or more of:

a gNodeB Central Unit User Plane (CU-UP) virtual network function;

a gNodeB Central Unit Control Plane (CU-CP) virtual network function; or a gNodeB Distributed Unit (DU) virtual network function.

22. The method of claim 20, wherein at least one of the one or more virtual network functions implements a subset of functional applications for either:

a gNodeB Central Unit User Plane (CU-UP) virtual network function;

a gNodeB Central Unit Control Plane (CU-CP) virtual network function; or a gNodeB Distributed Unit (DU) virtual network function.

23. The method of claim 20, wherein the one or more virtual network functions comprise at least one IPsec virtual gateway (VGW).

24. The method of claim 20, further comprising:

associating each virtual network interface for the first virtual network function with a first namespace for a first gNodeB wireless base station; and associating each virtual network interface for a second virtual network function with a second namespace for a second gNodeB wireless base station.

* * * * *